United States Patent
Ramaswamy et al.

(10) Patent No.: US 10,687,100 B2
(45) Date of Patent: *Jun. 16, 2020

(54) METHODS AND APPARATUS TO MEASURE EXPOSURE TO STREAMING MEDIA

(71) Applicant: The Nielsen Company (US), LLC, New York, NY (US)

(72) Inventors: Arun Ramaswamy, Tampa, FL (US); Alan Bosworth, Oldsmar, FL (US); Kevin K. Gaynor, Sunnyvale, CA (US); Narasimha Reddy Goli, Hyderabad (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,476

(22) Filed: Jun. 10, 2019

(65) Prior Publication Data

US 2019/0364312 A1 Nov. 28, 2019

Related U.S. Application Data

(63) Continuation of application No. 15/299,884, filed on Oct. 21, 2016, now Pat. No. 10,356,455, which is a
(Continued)

(51) Int. Cl.
*G06F 15/173* (2006.01)
*H04N 21/24* (2011.01)
(Continued)

(52) U.S. Cl.
CPC ......... *H04N 21/2407* (2013.01); *G06Q 30/02* (2013.01); *H04L 65/00* (2013.01);
(Continued)

(58) Field of Classification Search
CPC ..... H04L 65/00; H04L 67/2823; H04L 67/02; G06Q 30/02; H04N 21/25891; H04N 21/44008; H04N 21/812
(Continued)

(56) References Cited

U.S. PATENT DOCUMENTS 3,540,003 A 11/1970 Murphy
3,818,458 A 6/1974 Deese
(Continued)

FOREIGN PATENT DOCUMENTS

AU 2013205736 5/2013
AU 2014331927 10/2014
(Continued)

OTHER PUBLICATIONS

"ID3", published on Wikipedia, on Apr. 16, 2015, from en.wikipedia.org/wiki/ID3, 15 pages.
(Continued)

*Primary Examiner* — Anthony Mejia
(74) *Attorney, Agent, or Firm* — Hanley, Flight & Zimmerman, LLC

(57) ABSTRACT

Methods and apparatus to measure exposure to streaming media are disclosed. An example method includes detecting metadata associated with streaming media presented at a client device. Data is extracted from a first field of the metadata. The data from the first field of the metadata is processed to generate a first request directed to a first internet domain, the first internet domain based on the data, the first request including a media identifier from a second field of the metadata, the second field of the metadata separate from the first field of the metadata, the media identifier identifying the streaming media. In response to the detection of the metadata, the first request is sent from the client device to the first internet domain.

20 Claims, 17 Drawing Sheets

Related U.S. Application Data continuation of application No. 15/082,991, filed on Mar. 28, 2016, now Pat. No. 9,503,784, which is a continuation of application No. 14/144,352, filed on Dec. 30, 2013, now Pat. No. 9,332,035.

(60) Provisional application No. 61/890,176, filed on Oct. 11, 2013, provisional application No. 61/889,505, filed on Oct. 10, 2013.

(51) Int. Cl.
| | | |
|---|---|---|
| *H04L 29/08* | (2006.01) | |
| *G06Q 30/02* | (2012.01) | |
| *H04N 21/44* | (2011.01) | |
| *H04N 21/8352* | (2011.01) | |
| *H04L 29/06* | (2006.01) | |
| *H04N 21/258* | (2011.01) | |
| *H04N 21/442* | (2011.01) | |
| *H04N 21/81* | (2011.01) | |
| *H04N 21/2387* | (2011.01) | |
| *H04N 21/45* | (2011.01) | |
| *H04N 21/61* | (2011.01) | |
| *H04N 21/858* | (2011.01) | |
| *H04N 21/84* | (2011.01) | |

(52) U.S. Cl.
CPC ...... *H04L 65/4069* (2013.01); *H04L 65/4092* (2013.01); *H04L 65/604* (2013.01); *H04L 65/80* (2013.01); *H04L 67/02* (2013.01); *H04L 67/2814* (2013.01); *H04L 67/2823* (2013.01); *H04N 21/2387* (2013.01); *H04N 21/25883* (2013.01); *H04N 21/25891* (2013.01); *H04N 21/44008* (2013.01); *H04N 21/44204* (2013.01); *H04N 21/4532* (2013.01); *H04N 21/6125* (2013.01); *H04N 21/812* (2013.01); *H04N 21/8352* (2013.01); *H04N 21/84* (2013.01); *H04N 21/8586* (2013.01)

(58) Field of Classification Search
USPC .................................................. 709/200, 224
See application file for complete search history.

(56) References Cited

U.S. PATENT DOCUMENTS

| | | |
|---|---|---|
| 3,906,450 A | 9/1975 | Prado, Jr. |
| 3,906,454 A | 9/1975 | Martin |
| 4,168,396 A | 9/1979 | Best |
| 4,230,990 A | 10/1980 | Lert, Jr. et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Löfberg |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Wiedemer |
| 4,703,324 A | 10/1987 | White |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,182,770 A | 1/1993 | Medveczky et al. |
| 5,204,897 A | 4/1993 | Wyman |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Grube et al. |
| 5,497,479 A | 3/1996 | Hornbuckle |
| 5,499,340 A | 3/1996 | Barritz |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,841,978 A | 11/1998 | Rhoads |
| 5,848,396 A | 12/1998 | Gerace |
| 5,910,987 A | 6/1999 | Ginter et al. |
| 5,956,716 A | 9/1999 | Kenner et al. |
| 5,974,396 A | 10/1999 | Anderson et al. |
| 6,052,730 A | 4/2000 | Felciano et al. |
| 6,055,573 A | 4/2000 | Gardenswartz |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,164,975 A | 12/2000 | Weingarden et al. |
| 6,216,129 B1 | 4/2001 | Eldering |
| 6,223,215 B1 | 4/2001 | Hunt et al. |
| 6,247,050 B1 | 6/2001 | Tso et al. |
| 6,286,036 B1 | 9/2001 | Rhoads et al. |
| 6,286,140 B1 | 9/2001 | Ivanyi |
| 6,298,348 B1 | 10/2001 | Eldering |
| 6,415,323 B1 | 7/2002 | McCanne et al. |
| 6,434,614 B1 | 8/2002 | Blumenau |
| 6,460,079 B1 | 10/2002 | Blumenau |
| 6,463,445 B1 | 10/2002 | Suzuki et al. |
| 6,505,160 B1 | 1/2003 | Levy et al. |
| 6,529,952 B1 | 3/2003 | Blumenau |
| 6,642,966 B1 | 11/2003 | Limaye |
| 6,651,253 B2 | 11/2003 | Dudkiewicz et al. |
| 6,658,410 B1 | 12/2003 | Sakamaki et al. |
| 6,714,683 B1 | 3/2004 | Tian et al. |
| 6,829,368 B2 | 12/2004 | Meyer et al. |
| 6,839,680 B1 | 1/2005 | Liu et al. |
| 6,877,007 B1 | 4/2005 | Hentzel et al. |
| 6,970,886 B1 | 11/2005 | Conwell et al. |
| 6,993,590 B1 | 1/2006 | Gauthier et al. |
| 7,039,699 B1 | 5/2006 | Narin et al. |
| 7,058,697 B2 | 6/2006 | Rhoads |
| 7,092,926 B2 | 8/2006 | Cerrato |
| 7,095,871 B2 | 8/2006 | Jones et al. |
| 7,127,305 B1 | 10/2006 | Palmon |
| 7,150,030 B1 | 12/2006 | Eldering et al. |
| 7,159,023 B2 | 1/2007 | Tufts |
| 7,171,018 B2 | 1/2007 | Rhoads et al. |
| 7,181,412 B1 | 2/2007 | Fulgoni et al. |
| 7,215,280 B1 | 5/2007 | Percy et al. |
| 7,260,837 B2 | 8/2007 | Abraham et al. |
| 7,323,991 B1 | 1/2008 | Eckert et al. |

(56) References Cited

U.S. PATENT DOCUMENTS

| | | | |
|---|---|---|---|
| 7,343,417 B2 | 3/2008 | Baum |
| 7,363,278 B2 | 4/2008 | Schmelzer et al. |
| 7,363,643 B2 | 4/2008 | Drake et al. |
| 7,386,473 B2 | 6/2008 | Blumenau |
| 7,406,516 B2 | 7/2008 | Davis et al. |
| 7,444,388 B1 | 10/2008 | Svendsen |
| 7,526,538 B2 | 4/2009 | Wilson |
| 7,546,370 B1 | 6/2009 | Acharya et al. |
| 7,590,568 B2 | 9/2009 | Blumenau |
| 7,593,576 B2 | 9/2009 | Meyer et al. |
| 7,600,014 B2 | 10/2009 | Russell et al. |
| 7,613,635 B2 | 11/2009 | Blumenau |
| 7,634,786 B2 | 12/2009 | Knee et al. |
| 7,644,156 B2 | 1/2010 | Blumenau |
| 7,650,407 B2 | 1/2010 | Blumenau |
| 7,653,724 B2 | 1/2010 | Blumenau |
| 7,712,114 B2 | 5/2010 | Ramaswamy |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,827,312 B2 | 11/2010 | Ramaswamy et al. |
| 7,882,242 B2 | 2/2011 | Chen |
| 7,941,525 B1 | 5/2011 | Yavilevich |
| 7,949,565 B1 | 5/2011 | Eldering et al. |
| 7,958,234 B2 | 6/2011 | Thomas et al. |
| 7,962,603 B1 | 6/2011 | Morimoto |
| 7,962,934 B1 | 6/2011 | Eldering et al. |
| 8,006,259 B2 | 8/2011 | Drake et al. |
| 8,032,626 B1 | 10/2011 | Russell et al. |
| 8,046,255 B2 | 10/2011 | Bistriceanu |
| 8,060,601 B1 | 11/2011 | Brown et al. |
| 8,117,193 B2 | 2/2012 | Svendsen et al. |
| 8,131,861 B2 | 3/2012 | Butler et al. |
| 8,229,780 B2 | 6/2012 | Davidow et al. |
| 8,234,408 B2 | 7/2012 | Jungck |
| 8,266,687 B2 | 9/2012 | Baldry |
| 8,271,886 B2 | 9/2012 | Lee et al. |
| 8,302,120 B2 | 10/2012 | Ramaswamy |
| 8,307,006 B2 | 11/2012 | Hannan et al. |
| 8,370,489 B2 | 2/2013 | Mazumdar et al. |
| 8,387,084 B1 | 2/2013 | Klappert et al. |
| 8,495,198 B2 | 7/2013 | Sim et al. |
| 8,543,454 B2 | 9/2013 | Fleischman et al. |
| 8,578,272 B2 | 11/2013 | Pantos et al. |
| 8,626,084 B2 | 1/2014 | Chan et al. |
| 8,631,122 B2 | 1/2014 | Kadam et al. |
| 8,713,168 B2 | 4/2014 | Heffernan et al. |
| 8,839,338 B2 | 9/2014 | Eyer |
| 8,843,626 B2 | 9/2014 | Mazumdar et al. |
| 8,856,869 B1 | 10/2014 | Brinskelle |
| 8,909,771 B2 | 12/2014 | Heath |
| 8,910,195 B1 | 12/2014 | Barney et al. |
| 8,954,536 B2 | 2/2015 | Kalus et al. |
| 9,332,035 B2 | 5/2016 | Ramaswamy et al. |
| 9,503,784 B2 | 11/2016 | Ramaswamy et al. |
| 10,356,455 B2 | 7/2019 | Ramaswamy et al. |
| 2001/0031066 A1 | 10/2001 | Meyer et al. |
| 2001/0044851 A1 | 11/2001 | Rothman et al. |
| 2002/0016969 A1 | 2/2002 | Kimble |
| 2002/0032734 A1 | 3/2002 | Rhoads |
| 2002/0033842 A1 | 3/2002 | Zetts |
| 2002/0053078 A1 | 5/2002 | Holtz et al. |
| 2002/0059218 A1 | 5/2002 | August et al. |
| 2002/0062382 A1 | 5/2002 | Rhoads et al. |
| 2002/0069037 A1 | 6/2002 | Hendrickson et al. |
| 2002/0099609 A1 | 7/2002 | Nascenzi et al. |
| 2002/0111934 A1 | 8/2002 | Narayan |
| 2002/0112002 A1 | 8/2002 | Abato |
| 2002/0120925 A1 | 8/2002 | Logan |
| 2002/0124246 A1 | 9/2002 | Kaminsky et al. |
| 2002/0138852 A1 | 9/2002 | Reynolds et al. |
| 2002/0144262 A1 | 10/2002 | Plotnick et al. |
| 2002/0157112 A1 | 10/2002 | Kuhn |
| 2002/0162118 A1 | 10/2002 | Levy et al. |
| 2002/0194592 A1 | 12/2002 | Tsuchida et al. |
| 2003/0006911 A1 | 1/2003 | Smith et al. |
| 2003/0021441 A1 | 1/2003 | Levy et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0088674 A1 | 5/2003 | Ullman et al. |
| 2003/0093810 A1 | 5/2003 | Taniguchi |
| 2003/0105870 A1 | 6/2003 | Baum |
| 2003/0115598 A1 | 6/2003 | Pantoja |
| 2003/0177488 A1 | 9/2003 | Smith et al. |
| 2003/0220901 A1 | 11/2003 | Carr et al. |
| 2004/0003394 A1 | 1/2004 | Ramaswamy |
| 2004/0025181 A1 | 2/2004 | Addington et al. |
| 2004/0037271 A1 | 2/2004 | Liscano et al. |
| 2004/0073916 A1 | 4/2004 | Petrovic et al. |
| 2004/0088212 A1 | 5/2004 | Hill |
| 2004/0107125 A1 | 6/2004 | Guheen et al. |
| 2004/0128514 A1 | 7/2004 | Rhoads |
| 2004/0137929 A1 | 7/2004 | Jones et al. |
| 2004/0254887 A1 | 12/2004 | Jacoby |
| 2005/0033657 A1 | 2/2005 | Herrington et al. |
| 2005/0033758 A1 | 2/2005 | Baxter |
| 2005/0058319 A1* | 3/2005 | Rhoads ............ G06K 19/06046 382/100 |
| 2005/0138179 A1 | 6/2005 | Encarnacion et al. |
| 2005/0152287 A1 | 7/2005 | Yokomitsu et al. |
| 2005/0166233 A1 | 7/2005 | Beyda et al. |
| 2005/0192933 A1 | 9/2005 | Rhoads et al. |
| 2005/0193425 A1 | 9/2005 | Sull et al. |
| 2005/0223093 A1 | 10/2005 | Hanson et al. |
| 2006/0056625 A1 | 3/2006 | Nakabayashi et al. |
| 2006/0089754 A1 | 4/2006 | Mortenson |
| 2006/0107195 A1 | 5/2006 | Ramaswamy et al. |
| 2006/0161635 A1 | 7/2006 | Lamkin et al. |
| 2006/0178996 A1 | 8/2006 | Matsushima et al. |
| 2006/0184617 A1 | 8/2006 | Nicholas et al. |
| 2006/0190616 A1 | 8/2006 | Mayerhofer et al. |
| 2006/0242325 A1 | 10/2006 | Ramaswamy et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0055987 A1 | 3/2007 | Lu et al. |
| 2007/0074020 A1 | 3/2007 | Nishimura |
| 2007/0083611 A1 | 4/2007 | Farago et al. |
| 2007/0094304 A1 | 4/2007 | Horner et al. |
| 2007/0106787 A1 | 5/2007 | Blumenau |
| 2007/0106792 A1 | 5/2007 | Blumenau |
| 2007/0112837 A1 | 5/2007 | Houh et al. |
| 2007/0118873 A1 | 5/2007 | Houh et al. |
| 2007/0136777 A1 | 6/2007 | Hasek et al. |
| 2007/0156532 A1 | 7/2007 | Nyhan et al. |
| 2007/0162927 A1 | 7/2007 | Ramaswamy et al. |
| 2007/0186228 A1 | 8/2007 | Ramaswamy et al. |
| 2007/0198327 A1 | 8/2007 | Yazdani et al. |
| 2007/0198353 A1* | 8/2007 | Behringer ............ G06Q 30/02 705/14.55 |
| 2007/0208711 A1 | 9/2007 | Rhoads et al. |
| 2007/0244985 A1* | 10/2007 | Svendsen ............ H04N 7/173 709/217 |
| 2007/0250901 A1 | 10/2007 | McIntire et al. |
| 2007/0271580 A1 | 11/2007 | Tischer et al. |
| 2007/0276925 A1 | 11/2007 | La Joie et al. |
| 2007/0276926 A1 | 11/2007 | LaJoie et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0004958 A1 | 1/2008 | Ralph et al. |
| 2008/0028223 A1 | 1/2008 | Rhoads |
| 2008/0040354 A1 | 2/2008 | Ray et al. |
| 2008/0046499 A1 | 2/2008 | Cabrera et al. |
| 2008/0059160 A1 | 3/2008 | Saunders et al. |
| 2008/0082510 A1 | 4/2008 | Wang et al. |
| 2008/0083003 A1 | 4/2008 | Biniak et al. |
| 2008/0086356 A1 | 4/2008 | Glassman et al. |
| 2008/0120661 A1 | 5/2008 | Ludvig et al. |

(56) References Cited

U.S. PATENT DOCUMENTS

| | | |
|---|---|---|
| 2008/0126420 A1 | 5/2008 | Wright et al. |
| 2008/0139182 A1 | 6/2008 | Levy et al. |
| 2008/0140573 A1 | 6/2008 | Levy et al. |
| 2008/0201427 A1 | 8/2008 | Chen |
| 2008/0201472 A1 | 8/2008 | Bistriceanu et al. |
| 2008/0209491 A1 | 8/2008 | Hasek |
| 2008/0235077 A1 | 9/2008 | Harkness et al. |
| 2008/0235243 A1 | 9/2008 | Lee et al. |
| 2008/0240490 A1 | 10/2008 | Finkelstein et al. |
| 2008/0249961 A1 | 10/2008 | Harkness et al. |
| 2008/0250136 A1* | 10/2008 | Izrailevsky ............ H04L 67/22 709/224 |
| 2008/0276179 A1 | 11/2008 | Borenstein et al. |
| 2009/0015599 A1 | 1/2009 | Bennett et al. |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0076899 A1 | 3/2009 | Gbodimowo |
| 2009/0083417 A1 | 3/2009 | Hughes et al. |
| 2009/0106202 A1* | 4/2009 | Mizrahi ............ G06F 16/9566 |
| 2009/0119723 A1 | 5/2009 | Tinsman |
| 2009/0125934 A1 | 5/2009 | Jones et al. |
| 2009/0133093 A1 | 5/2009 | Hodge |
| 2009/0158318 A1 | 6/2009 | Levy |
| 2009/0164564 A1 | 6/2009 | Willis |
| 2009/0171715 A1* | 7/2009 | Conley ............ G06Q 30/0277 705/59 |
| 2009/0171762 A1 | 7/2009 | Alkove et al. |
| 2009/0217315 A1 | 8/2009 | Malik et al. |
| 2009/0254633 A1 | 10/2009 | Olive |
| 2009/0276313 A1 | 11/2009 | Wilhelm |
| 2009/0307061 A1 | 12/2009 | Monighetti et al. |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0008586 A1 | 1/2010 | Meyer et al. |
| 2010/0009722 A1 | 1/2010 | Levy et al. |
| 2010/0010866 A1 | 1/2010 | Bal et al. |
| 2010/0070621 A1 | 3/2010 | Urdan et al. |
| 2010/0076814 A1 | 3/2010 | Manning |
| 2010/0088152 A1 | 4/2010 | Bennett |
| 2010/0088373 A1 | 4/2010 | Pinkham |
| 2010/0088583 A1 | 4/2010 | Schachter |
| 2010/0094897 A1 | 4/2010 | Sumrall et al. |
| 2010/0114739 A1 | 5/2010 | Johnston |
| 2010/0121676 A1 | 5/2010 | Jackson |
| 2010/0125567 A1* | 5/2010 | Morris ............ G06F 16/907 707/722 |
| 2010/0153175 A1 | 6/2010 | Pearson et al. |
| 2010/0153207 A1 | 6/2010 | Roberts et al. |
| 2010/0153544 A1 | 6/2010 | Krassner et al. |
| 2010/0174774 A1 | 7/2010 | Kern et al. |
| 2010/0191723 A1 | 7/2010 | Perez et al. |
| 2010/0198911 A1* | 8/2010 | Zhang ............ H04L 67/146 709/203 |
| 2010/0205057 A1 | 8/2010 | Hook et al. |
| 2010/0241745 A1 | 9/2010 | Offen et al. |
| 2010/0241963 A1 | 9/2010 | Kulis et al. |
| 2010/0262498 A1 | 10/2010 | Nolet et al. |
| 2010/0262711 A1 | 10/2010 | Bouazizi |
| 2010/0268540 A1 | 10/2010 | Arshi et al. |
| 2010/0268573 A1 | 10/2010 | Jain et al. |
| 2010/0280641 A1 | 11/2010 | Harkness et al. |
| 2010/0299604 A1 | 11/2010 | Blumenau |
| 2010/0306257 A1 | 12/2010 | Levy |
| 2010/0312854 A1 | 12/2010 | Hyman |
| 2010/0318600 A1 | 12/2010 | Furbeck |
| 2010/0325051 A1 | 12/2010 | Etchegoyen |
| 2011/0016231 A1 | 1/2011 | Ramaswamy et al. |
| 2011/0016482 A1 | 1/2011 | Tidwell et al. |
| 2011/0030031 A1 | 2/2011 | Lussier et al. |
| 2011/0055314 A1 | 3/2011 | Rosenstein et al. |
| 2011/0087519 A1 | 4/2011 | Fordyce, III et al. |
| 2011/0087919 A1 | 4/2011 | Deshmukh et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0154185 A1 | 6/2011 | Kern et al. |
| 2011/0173200 A1 | 7/2011 | Yang et al. |
| 2011/0185016 A1* | 7/2011 | Kandasamy ............ G06Q 10/06 709/203 |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0208860 A1 | 8/2011 | Sim et al. |
| 2011/0231240 A1 | 9/2011 | Schoen et al. |
| 2011/0238520 A1 | 9/2011 | Selley |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0252118 A1 | 10/2011 | Pantos et al. |
| 2011/0276627 A1* | 11/2011 | Blechar ............ G06F 21/41 709/203 |
| 2011/0288907 A1 | 11/2011 | Harvey et al. |
| 2011/0296048 A1* | 12/2011 | Knox ............ H04L 65/605 709/231 |
| 2011/0321003 A1 | 12/2011 | Doig et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0096546 A1 | 4/2012 | Dilley et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0192214 A1 | 7/2012 | Hunn et al. |
| 2012/0206331 A1 | 8/2012 | Gandhi |
| 2012/0209918 A1 | 8/2012 | Shah et al. |
| 2012/0215621 A1 | 8/2012 | Heffernan et al. |
| 2012/0221559 A1 | 8/2012 | Kidron |
| 2012/0239407 A1 | 9/2012 | Lynch et al. |
| 2012/0239809 A1* | 9/2012 | Mazumdar ............ G06Q 30/0246 709/224 |
| 2012/0254466 A1 | 10/2012 | Jungck |
| 2012/0265735 A1 | 10/2012 | McMillan et al. |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2012/0311126 A1 | 12/2012 | Jadallah et al. |
| 2013/0007298 A1* | 1/2013 | Ramaswamy ............ H04N 21/2353 709/231 |
| 2013/0007794 A1 | 1/2013 | Besehanic et al. |
| 2013/0014144 A1 | 1/2013 | Bhatia et al. |
| 2013/0014223 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0061275 A1 | 3/2013 | Seo et al. |
| 2013/0080268 A1 | 3/2013 | Gordon et al. |
| 2013/0097285 A1 | 4/2013 | van Zwol et al. |
| 2013/0097311 A1 | 4/2013 | Mazumdar et al. |
| 2013/0097312 A1 | 4/2013 | Mazumdar et al. |
| 2013/0124628 A1 | 5/2013 | Weersinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0198383 A1 | 8/2013 | Tseng et al. |
| 2013/0202150 A1 | 8/2013 | Sinha et al. |
| 2013/0212188 A1 | 8/2013 | Duterque et al. |
| 2013/0231931 A1 | 9/2013 | Kulis et al. |
| 2013/0246389 A1 | 9/2013 | Osann, Jr. |
| 2013/0246609 A1 | 9/2013 | Topchy et al. |
| 2013/0247078 A1 | 9/2013 | Nikankin et al. |

(56) References Cited

U.S. PATENT DOCUMENTS

| | | | |
|---|---|---|---|
| 2013/0254897 A1 | 9/2013 | Reedy et al. | |
| 2013/0268623 A1 | 10/2013 | Besehanic et al. | |
| 2013/0268630 A1 | 10/2013 | Besehanic et al. | |
| 2013/0282898 A1 | 10/2013 | Kalus et al. | |
| 2013/0290508 A1 | 10/2013 | Besehanic et al. | |
| 2013/0291001 A1 | 10/2013 | Besehanic et al. | |
| 2013/0297411 A1 | 11/2013 | van Datta et al. | |
| 2013/0297467 A1 | 11/2013 | Kidron et al. | |
| 2013/0304777 A1* | 11/2013 | Bilinski | G06F 16/68 707/828 |
| 2013/0311478 A1* | 11/2013 | Frett | H04H 60/64 707/741 |
| 2013/0311776 A1 | 11/2013 | Besehanic | |
| 2013/0311780 A1* | 11/2013 | Besehanic | H04L 9/3247 713/176 |
| 2013/0332604 A1 | 12/2013 | Seth et al. | |
| 2014/0033317 A1 | 1/2014 | Barber | |
| 2014/0040171 A1 | 2/2014 | Segalov et al. | |
| 2014/0046777 A1* | 2/2014 | Markey | G06Q 30/0269 705/14.66 |
| 2014/0082220 A1 | 3/2014 | Ramaswamy et al. | |
| 2014/0123253 A1 | 5/2014 | Davis et al. | |
| 2014/0156761 A1 | 6/2014 | Heffernan et al. | |
| 2014/0173746 A1 | 6/2014 | Armstrong-Muntner et al. | |
| 2014/0229629 A1 | 8/2014 | Besehanic | |
| 2014/0229970 A1 | 8/2014 | Besehanic | |
| 2014/0244828 A1 | 8/2014 | Besehanic | |
| 2014/0280896 A1 | 9/2014 | Papakostas et al. | |
| 2014/0298365 A1 | 10/2014 | Matsubara et al. | |
| 2014/0301386 A1 | 10/2014 | Harrenstien et al. | |
| 2014/0324544 A1 | 10/2014 | Donato et al. | |
| 2014/0324545 A1 | 10/2014 | Splaine et al. | |
| 2014/0337104 A1 | 11/2014 | Splaine et al. | |
| 2015/0019322 A1 | 1/2015 | Alla et al. | |
| 2015/0019327 A1 | 1/2015 | Mazumdar et al. | |
| 2015/0046248 A1 | 2/2015 | Ben-Yaacov et al. | |
| 2015/0046579 A1 | 2/2015 | Perez et al. | |
| 2015/0052217 A1* | 2/2015 | Benguerah | H04L 67/02 709/217 |
| 2015/0070585 A1 | 3/2015 | Sharif-Ahmadi et al. | |
| 2015/0106505 A1* | 4/2015 | Ramaswamy | H04N 21/4532 709/224 |
| 2016/0212481 A1 | 7/2016 | Ramaswamy et al. | |

FOREIGN PATENT DOCUMENTS

| | | |
|---|---|---|
| CN | 1898662 | 1/2007 |
| CN | 101077014 | 11/2007 |
| CN | 105814901 | 7/2016 |
| EP | 0325219 | 7/1989 |
| EP | 0703683 | 3/1996 |
| GB | 2176639 | 12/1986 |
| JP | H05324352 | 12/1993 |
| JP | 2000041115 | 2/2000 |
| JP | 2001282982 | 10/2001 |
| JP | 2002163562 | 6/2002 |
| JP | 2002373152 | 12/2002 |
| JP | 2006127320 | 5/2006 |
| JP | 2006127321 | 5/2006 |
| JP | 2010039845 | 2/2010 |
| JP | 2010104285 | 9/2010 |
| JP | 2010282319 | 12/2010 |
| JP | 2013524319 | 6/2013 |
| KR | 20020037980 | 5/2002 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 0041115 | 7/2000 |
| WO | 2005013072 | 2/2005 |
| WO | 2010088372 | 8/2010 |
| WO | 2011097624 | 8/2011 |
| WO | 2012040371 | 3/2012 |
| WO | 2012087954 | 6/2012 |
| WO | 2012128895 | 9/2012 |
| WO | 2012177866 | 12/2012 |
| WO | 2012177870 | 12/2012 |
| WO | 2012177874 | 12/2012 |
| WO | 2013122907 | 8/2013 |
| WO | 2014172472 | 10/2014 |
| WO | 2015054445 | 4/2015 |

OTHER PUBLICATIONS

"Software development kit", published on Wikipedia, on Apr. 16, 2015, from en.wikipedia.org/wiki/Software_development_kit, 2 pages.
"Video: timed text tracks", published by Windows Internet Explorer, Microsoft, 2012, from http://msdn.microsoft.com/en-us/library/ie/hh673566(v=vs.85).aspx, 6 pages.
Adam, et al., "Privacy Preserving Integration of Health Care Data," published by AMIA, 2007 Symposium Proceedings, 6 pages.
Apple Inc. "HTTP Live Streaming Overview", Apr. 1, 2011, 36 pages.
Apple Inc. "Timed Metadata for HTTP Live Streaming", Apr. 28, 2011, 12 pages.
Buyya, et al., "Cloudbus Toolkit for Market-Oriented Cloud Computing", published by CloudCom 2009, LNCS 5931, Springer-Verlag, Berlin, Germany, © 2009, 21 pages.
Albanesius, "Facebook Issues Fix for Several Tracking Cookies", published by PC Magazine, on Sep. 28, 2011, from www.pcmag.com, 2 pages.
Dhillon, et al, "Leveraging Consumer Sensing Devices for Telehealth", published in CHINZ '12, Dunedin, New Zealand, on Jul. 2-3, 2012, 7 pages.
Protalinski, "Facebook denies cookie tracking allegations", from www.zdnet.com, on Sep. 25, 2011, 2 pages.
Protalinski, "Facebook fixes cookie behavior after logging out", from www.zdnet.com, on Sep. 27, 2011, 2 pages.
Protalinski, "US congressmen ask FTC to investigate Facebook cookies", from www.zdnet.com, on Sep. 28, 2011, 2 pages.
Winkelman, "Timed Text Tracks and TV Services", published by CableLabs, on Aug. 15, 2011, 5 pages.
Evensen, et al., "AdScorer: An Event-Based System for Near Real-Time Impact Analysis of Television Advertisements", published by DEBS '12, Berlin, Germany, on Jul. 16-20, 2012, 22 pages.
"Fliptop Person API Documentation", published by Fliptop, on May 7, 2013, from https://developer.fliptop.com/documentation, 6 pages.
"Get, Keep and Grow Customers with Fliptop's Customer Intelligence Application", published by Fliptop, on May 7, 2013, from www.fliptop.com/features#social_matching, 3 pages.
"What is Fliptop?", published by Fliptop, on May 7, 2013, from www.fliptop.com/about_us, 1 page.
International Searching Authority, "International Search Report and Written Opinion", issued in connection with International Patent Application No. PCT/US2014/034389, dated Sep. 5, 2014, 15 pages.
IP Australia, "Examination Report", issued in connection with Australian Patent Application No. 2014254014, dated Jun. 17, 2015, 3 pages.
"JavaScript and AJAX Forum", from http://www.webmasterworld.com/ forum91/4465.htm, on Jun. 29, 2011, 4 pages.
Launder, "Media Journal: Nielsen to Test Online-TV Viewing Tool," published in The Wall Street Journal, on Apr. 30, 2013, 2 pages.
Liu, et al, "Socialize Spontaneously with Mobile Applications", published in INFOCOM 2012, Orlando, FL, on Mar. 25-30, 2012, 9 pages.
"Mental Poker", published on Wikipedia, on Sep. 21, 2010, from http://en.wikipedia.org/wiki/Mental_poker, 5 pages.
"Nielsen Unveils New Online Advertising Measurement", The Nielsen Company, on May 31, 2012, from http://nielsen.com/us/en/insights/press-room/201O/nielsen_unveils_newonlineadvertisingmeasurement.html, 3 pages.

(56) References Cited

OTHER PUBLICATIONS

Cubrilovic, "Logging out of Facebook is not enough", published by New Web Order, on Sep. 25, 2011, from www.nikcub.appspot.com, 3 pages.
Pantos, et al., "HTTP Live Streaming: draft-pantos-http-live-streaming-07", published by Apple Inc., on Sep. 30, 2011, 33 pages.
Rainier, "Why Businesses Should Use Google Plus", published by The Social Media Guide, on May 7, 2013, from thesocialmediaguide.com/social_media/why-businesses-should-use-google-plus, 9 pages.
"Fast. Simple. Secure", published on Rapleaf, on May 7, 2013, from www.rapleaf.com/why-rapleaf/, 3 pages.
"Frequently Asked Questions", published on Rapleaf, on May 7, 2013, from www.rapleaf.com/about-us/faq/#where, 3 pages.
"The Consumer Data Marketplace", published on Rapleaf, on May 7, 2013, from www.rapleaf.com/under-the-hood/, 2 pages.
Sharma, "Nielsen Gets Digital to Track Online TV Viewers", published by Wall Street Journal, on Apr. 30, 2013, 3 pages.
Coffey, "Internet Audience Measurement: A Practitioner's View", published by Journal of Interactive Advertising, vol. 1, No. 2, on Spring 2001, 8 pages.
Vega, "Nielsen Introduces New Ad Measurement Product", published by The New York Times, on Sep. 27, 2010, 7 pages.
Vranica, "Nielsen Testing a New Web-Ad Metric", published by The Wall Street Journal, on Sep. 23, 2010, 2 pages.
Whiting, et al., "Creating an I Phone Application for Collecting Continuous ABC Data", published by Journal of Applied Behavior Analysis, vol. 45, No. 3, on Fall 2012, 14 pages.
Japanese Patent Office, "Office Action", issued in connection with Application No. 2015-525656, on Dec. 1, 2015, 6 pages.
International Searching Authority, "International Search Report and Written Opinion", issued in connection with International Application No. PCT/US2014/059809, dated Jan. 13, 2015, 12 pages.
Korean Intellectual Property Office, "Notice of Preliminary Rejection", issued in connection with Application 10-2014-7034045, dated Mar. 22, 2016, 7 pages.
United States Patent Office, "Non-Final Office Action", issued in connection with U.S. Appl. No. 13/963,737, dated May 17, 2016, 16 pages.
United States Patent Office, "Notice of Allowance", issued in connection with U.S. Appl. No. 14/144,352, dated Dec. 23, 2015, 88 pages.
European Patent Office, "Extended European Search Report", issued in connection with International Application No. PCT/US2014/059809, dated Mar. 31, 2017, 11 pages.
Nilsson, "ID3 tag version 2.3.0", published on Feb. 3, 1999, from http://www.id3.org/id3v2.3.0.txt, 35 pages.
IP Australia, "Examination report No. 1", issued in connection with Australian Application No. 2014331927, dated Mar. 28, 2017, 2 pages.
IP Australia, "Notice of grant for patent", issued in connection with Australian Application No. 2014331927, dated Oct. 5, 2017, 1 pages.
IP Australia, "Certificate of Grant", issued in connection with Australian Application No. 2014331927, dated Oct. 5, 2017, 1 pages.
IP Australia, "Notice of acceptance", issued in connection with Australian Application No. 2014331927, dated Jun. 9, 2017, 3 pages.
United States Patent Office, "Notice of Allowance and Fee(s) Due", issued in connection with U.S. Appl. No. 15/082,991, dated Jul. 14, 2016, 30 pages.
The State Intellectual Property Office of China, "First Notification of Office Action", dated May 28, 2018 in relation to application No. 201480065971.2, 11 pages (including English translation).
United States Patent and Trademark Office, "Non-Final Office Action," issued in connection with U.S. Appl. No. 15/299,884, dated Jul. 16, 2018.
United States Patent and Trademark Office, "Notice of Allowance," issued in connection with U.S. Appl. No. 15/299,884, dated Jan. 24, 2019.
European Patent Office, "Examination Report," issued in connection with E.P. Patent Application No. 14851645.3-1208, dated May 8, 2019, 6 pages.
European Patent Office, "Office Action," issued in connection to European Patent Application No. 14851645.3, dated Mar. 17, 2020, 6 pages.

* cited by examiner

| MEDIA IDENTIFIER | USER IDENTIFIER | TIMESTAMP |
|---|---|---|
| MEDIA 0001 | USER A | 2013-10-11 11:11:03AM |
| MEDIA 0001 | USER B | 2013-10-11 2:43:54PM |
| MEDIA 0001 | USER C | 2013-10-11 3:45:30PM |
| MEDIA 0002 | USER A | 2013-10-11 11:15:32AM |
| MEDIA 0002 | USER D | 2013-10-12 09:13:13AM |
| ... | ... | ... |

FIG. 10A

| | USER IDENTIFIER (1082) | AGE (1083) | INCOME (1084) |
|---|---|---|---|
| 1085 | USER A | 24 | $30,000 per year |
| 1086 | USER B | 32 | $92,000 per year |
| 1087 | USER C | 48 | $45,000 per year |
| 1088 | USER D | 63 | $47,000 per year |
| | ... | ... | ... |

| MEDIA IDENTIFIER | AGE (under 20) | AGE (20-40) | AGE (40-60) | AGE (over 60) | INCOME (under $40K per year) | INCOME ($40K-$80K per year) | INCOME (over $80K per year) |
|---|---|---|---|---|---|---|---|
| MEDIA 0001 | 0 | 1 | 2 | 0 | 1 | 1 | 1 |
| MEDIA 0002 | 0 | 1 | 0 | 0 | 1 | 1 | 0 |
| ... | ... | ... | ... | ... | ... | ... | ... |

METHODS AND APPARATUS TO MEASURE EXPOSURE TO STREAMING MEDIA

RELATED APPLICATIONS

This patent arises from a continuation of U.S. patent application Ser. No. 15/299,884, filed on Oct. 21, 2016, and entitled "METHODS AND APPARATUS TO MEASURE EXPOSURE TO STREAMING MEDIA", which is a continuation of U.S. patent application Ser. No. 15/082,991, filed on Mar. 28, 2016, and entitled "METHODS AND APPARATUS TO MEASURE EXPOSURE TO STREAMING MEDIA", which is a continuation of U.S. patent application Ser. No. 14/144,352, filed on Dec. 30, 2013 and entitled "METHODS AND APPARATUS TO MEASURE EXPOSURE TO STREAMING MEDIA," which claims the benefit of U.S. Provisional Patent Application Ser. No. 61/889,505, which was filed on Oct. 10, 2013 and of U.S. Provisional Patent Application Ser. No. 61/890,176, which was filed on Oct. 11, 2013. U.S. patent application Ser. No. 15/299,884, U.S. patent application Ser. No. 15/082,991, U.S. patent application Ser. No. 14/144,352, U.S. Provisional Patent Application Ser. No. 61/889,505, and U.S. Provisional Patent Application Ser. No. 61/890,176 are hereby incorporated herein by reference in their entireties.

FIELD OF THE DISCLOSURE

This disclosure relates generally to measuring media exposure, and, more particularly, to methods and apparatus to measure exposure to streaming media.

BACKGROUND

In recent years, media devices have been provided with Internet connectivity and the ability to retrieve media from the Internet. As such, media exposure has shifted away from conventional methods of presentation, such as broadcast television, towards presentation via consumer devices accessing the Internet to retrieve media for display.

Media providers and/or other entities such as, for example, advertising companies, broadcast networks, etc. are often interested in the viewing, listening, and/or media behavior of audience members and/or the public in general. The media usage and/or exposure habits of audience members as well as demographic data about the audience members is collected and used to statistically determine the size and demographics of an audience of interest.

Traditionally, audience measurement entities determine audience engagement levels for media programming and/or advertisements based on registered panel members. That is, an audience measurement entity enrolls people who consent to being monitored into a panel. The audience measurement entity then monitors those panel members to determine media (e.g., television programs, radio programs, movies, DVDs, etc.) presented to those panel members. In this manner, the audience measurement entity can determine exposure measures for different media (e.g., content and/or advertisements) based on the collected media measurement data.

BRIEF DESCRIPTION OF THE DRAWINGS

FIG. 10A is a table representative of impression data recorded by the example database proprietor.

FIG. 10B is a table representative of demographic information stored by the database proprietor.

FIG. 10C is a table representative of aggregated media presentation information as transmitted to the central facility by the database proprietor.

Wherever possible, the same reference numbers will be used throughout the drawing(s) and accompanying written description to refer to the same or like parts.

DETAILED DESCRIPTION

Figure 1:
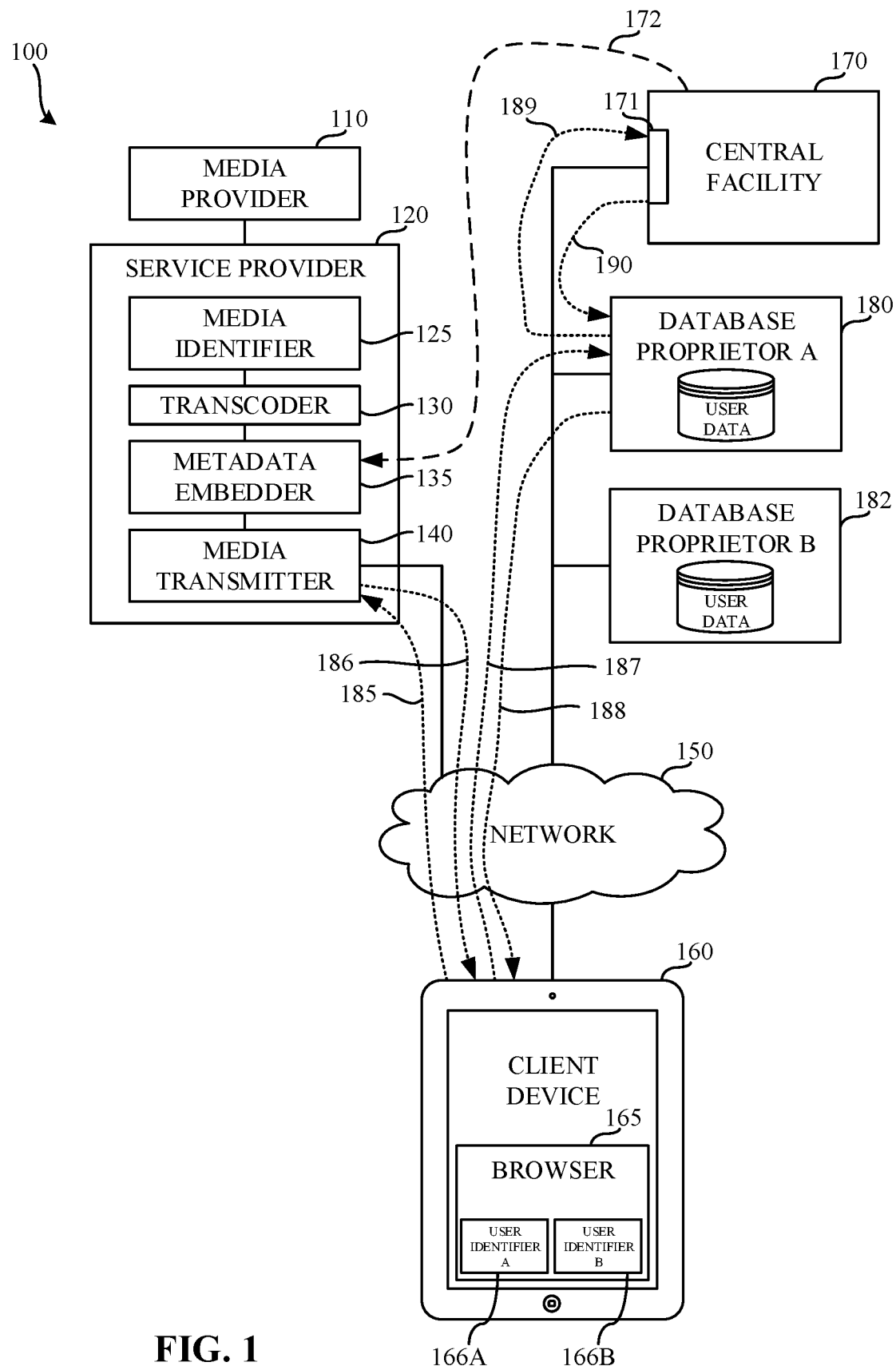
FIG. 1 depicts an example system that may be used to determine exposure to streaming media.

Monitoring companies desire to gain knowledge on how users interact with media devices such as smartphones, tablets, laptops, smart televisions, etc. In particular, the media monitoring companies want to monitor media presentations made at the media devices to, among other things, monitor exposure to advertisements, determine advertisement effectiveness, determine user behavior, identify purchasing behavior associated with various demographics, determine popularity ratings for content, etc. Monitoring companies enlist panelists and collect demographic information about the panelists. Media presentation information is then collected in association with the panelists. However, it is difficult for monitoring companies to collect detailed demographic information from every user to whom media is presented (e.g., non-panelists). In examples disclosed herein, monitoring companies cooperate with database proprietors (e.g., Facebook, Twitter, Experian, etc.) that have large databases of demographic information to extend media monitoring capabilities to non-panelists.

In examples disclosed herein, the presented media is identified using transcoded watermarks. The transcoded watermarks are transmitted as metadata (e.g., an ID3 tag)

that is sent in association with and/or as part of the media. The media presentation device (e.g., an iPad, a smart TV, etc.) extracts the metadata and transmits the metadata to the database proprietor along with information that identifies the media device and/or a user of the media device to the database proprietor. If the database proprietor cannot identify the media device and/or a user of the media device, the database proprietor redirects the media device to a different database proprietor and/or the audience measurement entity, so that the media device and/or a user of the media device can be identified. If the database proprietor can identify the media device and/or a user of the media device, the database proprietor reports demographic information associated with the media device and/or user of the media device to the audience measurement entity for association with the media and/or the metadata identifying the media. In some examples, the metadata is not transmitted to the database proprietor to prevent the database proprietor from identifying the media accessed by the media device and/or the user.

Traditionally, audience measurement entities (also referred to herein as "ratings entities") determine demographic reach for advertising and/or media programming based on registered panel members. That is, an audience measurement entity enrolls people that consent to being monitored into a panel. During enrollment, the audience measurement entity receives demographic information from the enrolling people so that subsequent correlations may be made between media exposure to those panelists and different demographic markets. The audience measurement entity then sets and/or retrieves a user and/or device identifier so that subsequent impressions related to the panelist can be associated with the panelist and/or the demographics of the panelist. In some examples, the user and/or device identifier is cookie data or another identifier that is used by a media device (e.g., an iPad) when communicating with the audience measurement entity. Based on the user and/or device identifier, the audience measurement entity identifies demographic information provided by the panelist. In exchange for providing detailed demographic information, panelists are sometimes provided with incentives (e.g., apps, gift cards, cash, entry into a raffle and/or drawing, etc.). Accordingly, having a large panel can sometimes become cost prohibitive.

To alleviate the costs of constructing and/or maintaining a large panel, the audience measurement entity cooperates with other entities to obtain demographic information associated with media presentations. Example methods, apparatus, and/or articles of manufacture disclosed herein enable an audience measurement entity to request demographic information from other entities that operate based on user registration models. Cooperation with other entities that operate based on user registration models enables the audience measurement entity to effectively increase the size of the panel of users.

As used herein, a user registration model is a model in which users subscribe to services of those entities by creating an account and providing demographic-related information about themselves. Sharing of demographic information associated with registered users of database proprietors enables an audience measurement entity to receive audience measurement information from external sources (e.g., database proprietors), thus extending the coverage, accuracy, and/or completeness of their demographics-based audience measurements. Such access also enables the audience measurement entity to monitor persons who would not otherwise have joined an audience measurement panel.

Any entity having a database identifying demographics of a set of individuals may cooperate with the audience measurement entity. Such entities may be referred to as "database proprietors" and include entities such as wireless service carriers, mobile software/service providers, social networking sites (e.g., Facebook, Twitter, LinkedIn, Google, etc.), online retailer sites (e.g., Amazon.com, Buy.com, etc.), and/or any other Internet site that maintains user registration records (e.g., Yahoo!, MSN, Apple iTunes, Experian, etc.) There are many database proprietors operating on the Internet. Database proprietors provide services to large numbers of subscribers. In exchange for the provision of the service, the subscribers register with the proprietor. As part of this registration, the subscribers provide detailed demographic information. The database proprietors, as part of the use of the provided service (e.g., a social networking service, a shopping service, a news service, etc.) have access to set and/or collect cookies and/or other identifiers stored by a browser.

The database proprietor(s) report media presentation information and demographic information associated with the media presentation to the audience measurement entity. In traditional panelist-based systems, the panelist is aware that they are sharing demographic information with the audience measurement entity. However, in examples disclosed herein, demographic information is retrieved from a database proprietor and, accordingly, comes with data privacy concerns (because users may be unaware of the sharing of their demographic information). To that end, users may approve or prevent the sharing of demographic information on the part of the database proprietor. For example, when creating an account with the database proprietor(s), a user may be asked for their permission to share demographic information with other entities (e.g., the audience measurement entity).

In further contrast to demographic information received when enrolling panelists (where the panelist is requested to provide very detailed demographic information to the audience measurement entity), the demographic information collected by the database proprietor may not be as detailed as demographic information that would otherwise be collected by the audience measurement entity. For example, the database proprietor might not request demographic information related to the user's income, the user's interests, the user's race, etc. Furthermore, different database proprietors may request and/or store different information from the user. For example, a social media database proprietor may store demographic information related to user's race, interests, location, etc. while a credit reporting database proprietor may store demographic information related to a user's financial information (e.g., income, credit score, etc.).

In examples disclosed herein, database proprietors provide demographic information concerning users to the audience measurement entity (e.g., The Nielsen Company of Schaumburg, Ill., United States of America) in association with particular pieces of media. The demographic information, in some examples, is provided in the aggregate. In some examples, a database proprietor transmits demographic information on an aggregate basis when a threshold number of users to whom a particular piece of media was presented is reached. For example, aggregated demographic information may be provided only when there are more than one hundred users associated with the media. However, any other threshold amount of users may additionally or alternatively be used. In contrast, demographic information may be provided to the ratings entity on an individual basis when a single user is identified in association with the demographic information. Whether to provide the demographic information to the ratings entity in the aggregate or individually may be determined by the database proprietor for any reason such as, for example, privacy laws in the jurisdiction of the database proprietor, business factors, technical limitations, etc.

In some examples, to more accurately associate media presentations with the correct demographics, example methods, apparatus, and/or articles of manufacture disclosed herein leverage user information located in the audience measurement entity's records (e.g., panelist information) as well as user information located at one or more database proprietors (e.g., web service providers) that maintain records or profiles of users having accounts therewith. In some examples, multiple database proprietors may report demographic information to the media monitoring entity in association with the same media. Multiple sources (e.g., demographic information from the panels of an audience measurement company and/or registered user data of web service providers) may be useful because the additional data results in improved accuracy of demographic metrics for content and/or advertising campaigns. Example techniques disclosed herein use online registration data to identify demographics of users to track quantities of impressions attributable to demographics associated with those users. As used herein, an impression refers to an exposure to media (e.g., content and/or an advertisement). In Internet advertising, a quantity of impressions or impression count is the total number of times an advertisement or advertisement campaign has been accessed by a population. Impressions do not take into account multiple exposures to the same individual (i.e., two exposures to the same person count as two impressions). In contrast, unique impression counts eliminate duplicate exposures and, thus, only count one exposure per person irrespective of how many times that person may actually experience an exposure.

As used herein, the term "media" includes any type of content and/or advertisement delivered via any type of distribution medium. Thus, media includes television programming or television advertisements, radio programming or radio advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone such as an Apple iPhone®, a Samsung Galaxy S® 4, etc.), video game consoles (e.g., Xbox®, PlayStation® 3), tablet computers (e.g., an iPad®), digital media players (e.g., AppleTV®, a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or device and/or user-identifying information (e.g., a username, a media access control (MAC) address, an Internet Protocol (IP) address, an Apple ID, a panelist identifier, a Google ID, any other type of identifier, etc.).

Media devices such as tablet computers (e.g., an Apple iPad®, an Asus Transformer™, etc.) present media using apps and/or browsers that access, retrieve, request, and/or present media (e.g., Internet media). Many different browsers exist such as, for example, Google Chrome®, Mozilla Firefox, Apple Safari®, Dolphin, etc. Apps and/or browser(s) can be downloaded by users through app stores such as, for example, Apple iTunes®, Google Play®, etc.

Operating systems of the media devices and/or browsers operated by the media devices are often closed platforms. That is, the operating systems and/or browsers provide a limited set of functions that can be accessed. In some examples, browsers have access to a limited set of functionality for sharing data outside of the media device. For example, browsers may have access to a limited set of user information (e.g., cookies), and/or may not allow programmatic access to audio and/or video of media presented by the device. Cookies can be used to store information related to a user of the media device in association with an accessed domain (e.g., Facebook.com, twitter.com, Nielsen.com, etc.). For example, a username may be stored in association with a particular domain, display settings may be stored in association with the domain, etc. Traditionally, cookies are of limited use for identifying users across domains. For example, browsers are only permitted to transmit cookies when accessing a site having a domain name matching the cookies. For example, browsers are not allowed to transmit cookies associated with the domain "xyz.com" when accessing the domain "abc.com."

While cookies and/or other identifiers can be used to identify the media device and/or a user of the media device to the audience measurement entity and/or the database proprietor, it is equally important to properly identify the media presented via the media device. Media is traditionally identified using codes, signatures, watermarks, etc. embedded in audio and/or video of the media. However, identification of an audio and/or video watermark at media devices presents difficulties. For example, some media devices do not allow programmatic access to the audio and/or video of the media, processing audio and/or video watermarks may quickly drain a battery of the media device, etc. Examples disclosed herein address this problem through transcoding. In some such examples, a service provider (e.g., a streaming media provider) transcodes the watermark into a format which is readily ascertainable by the media device.

In some examples, media-identifying metadata having a first format is extracted from the presented media. The media-identifying metadata may indicate, for example, a watermark associated with the media, a universal resource locator (URL) (e.g., a URL of a database proprietor, etc.) indicating where to transmit a notification of the media presentation. In some such examples, the transport stream corresponds to a Moving Picture Experts Group (MPEG) 2 transport stream sent according to a hypertext transfer protocol (HTTP) live streaming (HLS) protocol. In some examples, the watermark is an audio watermark that is embedded in an audio portion of the media using a first metadata format. In some examples, the watermark having the first format is transcoded into media-identifying metadata having a second format. The media-identifying metadata having the second format may correspond to, for example, a textual representation of the watermark, such as a base-64 hexadecimal string of characters. In some examples, the media-identifying metadata is transmitted in a metadata transport stream associated with the media.

In some disclosed examples, streaming media is delivered to the media device using HTTP Live Streaming (HLS).

However, any other past, present, and/or future method of streaming media to the media device may additionally or alternatively be used such as, for example, an HTTP Secure (HTTPS) protocol. HLS transport streams allow metadata to be included in and/or associated with, for example, a media stream, a timed text track, etc. In some disclosed examples, a media device uses a browser to display media received via HLS. Additionally or alternatively, in some disclosed examples the media device uses a media presenter (e.g., a browser plugin, an app, a framework, an application programming interface (API), etc.) to display media received via HLS.

Some example methods disclosed herein include decoding the HLS transport stream carrying the media-identifying metadata streamed to a media device to obtain the media. Some such example methods also include extracting metering data from the media and/or receiving metering data from an independent metering data source (e.g., a timed text track file sent in association with the media, a manifest file, etc.). In some examples, in addition to identifying the media, the media-identifying metadata may additionally or alternatively identify a source of the media. Additionally, some such example methods further include decoding media-identifying metadata (e.g., such as electronic guide (EPG) data, playlist data, etc.) already accompanying the transport stream carrying the media. Some such example methods further include verifying the media identifying metadata using the metering data (e.g., the transcoded watermark) extracted from the media.

In examples disclosed herein, media exposure metrics are monitored by retrieving metadata embedded in or otherwise transported with the media presented via a media presenter of the media device. In some examples, the metadata is stored in a Document Object Model (DOM) object. The DOM is a cross-platform and language-independent convention for representing and interacting with objects in Hypertext Markup Language (HTML). In some examples, media presenters (e.g., media plugins) such as, for example, the QuickTime player, emit DOM events that can be captured via JavaScript. By capturing the DOM events triggered by the media presenter, it is possible to extract metadata via the DOM. Once extracted, the metadata may be combined with other information such as, for example, cookie or other user identifying data associated with the user of the device, and transmitted to, for example, a database proprietor and/or the audience measurement entity for analysis and/or computation with data collected from other devices.

In some examples, the metadata is stored in an ID3 tag format, although any other past, present, and/or future metadata format may additionally or alternatively used. An ID3 tag is a metadata container that may be appended to and/or transmitted in association with media. In the examples disclosed herein, an ID3v2 format is used. In particular, the media-identifying metadata is stored in a private frame of the ID3 tag. However, any other past, present, or future way of storing media-identifying metadata may additionally or alternatively be used.

In examples disclosed herein, a software development kit (SDK) is provided to website developers from, for example, an audience measurement entity or other entity. The SDK facilitates instrumenting and/or otherwise enabling websites (e.g., media websites (such as streaming video websites), news websites, image websites, social media websites, online gaming websites, etc.) with monitoring functionalities which collect and transmit monitoring information (e.g., a cookie and/or other user or device identifier, a media identifier (the ID3 tag), etc.) to a database proprietor and/or the audience measurement entity. In particular, the website developers create websites that include media monitoring instructions using the SDK. Accordingly, rather than relying on a dedicated monitoring application installed on a computer (e.g., a tablet, a laptop, a smartphone, etc.), websites disclosed herein are instrumented with monitoring instructions such that the browser transmits monitoring information to the database proprietor and/or the monitoring entities (e.g., the audience measurement entity). In some examples, monitoring instructions provided by the SDK are implemented using JavaScript instructions. However, any other language or type of script or instructions may additionally or alternatively be used. The monitoring instructions enable the browser to notify the database proprietor and/or the monitoring entities (e.g., the audience measurement entity) when a website and/or media associated with the website is presented, notify the database proprietor and/or the monitoring entities (e.g., the audience measurement entity) what media and/or website(s) are presented, notify the database proprietor and/or the monitoring entities (e.g., the audience measurement entity) how the website and/or media is being presented (e.g. via a tablet display, via a television, etc.), notify the database proprietor and/or the monitoring entities (e.g., the audience measurement entity) of a duration of exposure of a website and/or media associated with the website, etc. In some examples, the media monitoring instructions may be triggered by, for example presentation of a media element such as, for example, a video, audio, an image, etc.

Example methods, apparatus and/or articles of manufacture disclosed herein enable reporting of media impressions and corresponding demographics from the database proprietor to the ratings entity, also referred to herein as an audience measurement entity (AME.) In this manner, the AME can track media impressions on media devices, and/or create reports of media impressions broken down by different demographic statistics.

Example methods, apparatus, and articles of manufacture disclosed herein can be used to determine media impressions, content impressions, advertisement impressions, content exposure, and/or advertisement exposure using user information, which is distributed across different databases (e.g., different website owners, service providers, etc.) on the Internet. Not only do example methods, apparatus, and articles of manufacture disclosed herein enable more accurate correlation of Internet media exposure to user (e.g., demographics) information, but they also effectively extend panel sizes and compositions beyond persons participating in the panel of a monitoring entity (e.g., an audience measurement entity and/or a ratings entity) to persons registered in Internet databases such as the databases of wireless service carriers, mobile software/service providers, social medium sites (e.g., Facebook, Twitter, Google, etc.), and/or any other Internet sites such as Yahoo!, MSN, Apple iTunes, Experian, etc. This extension effectively leverages the media exposure tracking capabilities of a monitoring entity (e.g., the audience measurement entity) and the databases of non-AME entities such as social media and/or other websites to create an enormous, demographically accurate panel that results in accurate, reliable measurements of exposures to media such as advertising and/or content (e.g., programming).

FIG. 1 is a diagram of an example system 100 constructed in accordance with the teachings of this disclosure for measuring exposure to streaming media. The example system 100 of FIG. 1 monitors media provided by an example media provider 110 for presentation on an example client device 160 via an example network 150. The example system 100 includes an example service provider 120, an example browser 165, a first database proprietor 180, a second database proprietor 182, and an example central facility 170 of an audience measurement entity. While the illustrated example of FIG. 1 discloses an example implementation of the service provider 120, other example implementations of the service provider 120 may additionally or alternatively be used, such as the example implementations disclosed in U.S. patent application Ser. No. 13/341,646, U.S. patent application Ser. No. 13/443,596, U.S. patent application Ser. No. 13/793,991, U.S. patent application Ser. No. 13/445,961, U.S. patent application Ser. No. 13/472,170, U.S. patent application Ser. No. 13/793,983, U.S. patent application Ser. No. 13/767,548, U.S. patent application Ser. No. 13/793,959, U.S. patent application Ser. No. 13/778,108, U.S. Patent Application Ser. No. 61/813,019, and/or U.S. patent application Ser. No. 13/963,737, which are hereby incorporated by reference herein in their entirety.

The example media provider 110 of the illustrated example of FIG. 1 represents any one or more media provider(s) capable of providing media for presentation at the client device 160. The media provided by the media provider(s) 110 can be any type of media, such as audio, video, multimedia, webpages, etc. Additionally, the media can correspond to live (e.g., broadcast) media, stored media (e.g., on-demand content), etc.

The service provider 120 of the illustrated example of FIG. 1 provides media services to the client device 160 via, for example, web pages including links (e.g., hyperlinks, embedded media, etc.) to media provided by the media provider 110. In the illustrated example, the service provider 120 modifies the media provided by the media provider 110 prior to transmitting the media to the client device 160. In the illustrated example, the service provider 120 includes an example media identifier 125, an example transcoder 130, an example metadata embedder 135, and an example media transmitter 140.

The media identifier 125 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The media identifier 125 of FIG. 1 extracts metering data (e.g., signatures, watermarks, etc.) from the media obtained from the media provider 110. For example, the media identifier 125 can implement functionality provided by a software development kit (SDK) to extract one or more audio watermarks, one or more video (e.g., image) watermarks, etc., embedded in the audio and/or video of the media obtained from the media provider 110. (For example, the media may include pulse code modulation (PCM) audio data or other types of audio data, uncompressed video/image data, etc.)

The example media identifier 125 of FIG. 1 determines (e.g., derives, decodes, converts, etc.) the metering data (e.g., media identifying information, source identifying information, etc.) included in or identified by a watermark embedded in the media and converts this metering data and/or the watermark itself into a text and/or binary format for inclusion in an ID3 tag and/or other data type (e.g., text, binary, etc.) for transmission as metadata (e.g., such as with a playlist or electronic program guide) accompanying the streaming media. For example, the code/watermark itself may be extracted and inserted as metadata in, for example, a text or binary format in the ID3 tag. Thus, the metadata and/or media-identifying metadata included in the ID3 tag may be a text or binary representation of a code, a watermark, and/or metadata or data identified by a code and/or watermark, etc. Additionally or alternatively, the watermark may be used to retrieve metering data from a local or remote database. In some examples, the media-identifying metadata is stored in a private frame of the ID3 tag. In some other examples, the ID3 tag includes a location of a database proprietor to which the monitoring information should be sent.

The example transcoder 130 of the illustrated example of FIG. 1 is implemented by a logic circuit such as a processor executing instructions, but could additionally or alternatively be implemented by an analog circuit, ASIC, DSP, FPGA, and/or other circuitry. In some examples, the transcoder 130 and the media identifier 125 are implemented by the same physical processor. In the illustrated example, the transcoder 130 employs any appropriate technique(s) to transcode and/or otherwise process the received media into a form suitable for streaming (e.g., a streaming format). For example, the transcoder 130 of the illustrated example transcodes the media in accordance with MPEG 4 audio/video compression for use with the HLS protocol.

The metadata embedder 135 of the illustrated example of FIG. 1 is implemented by a logic circuit such as a processor executing instructions, but could additionally and/or alternatively be implemented by an analog circuit, ASIC, DSP, FPGA, and/or other circuitry. In some examples, the transcoder 130, the media identifier 125, and the metadata embedder 135 are implemented by the same physical processor.

In the illustrated example, the metadata embedder 135 embeds the metadata determined by the media identifier 125 into the transport stream(s) carrying the streaming media. In the illustrated example, the metadata embedder 135 embeds the metadata into an internal metadata channel, such as by encoding metadata that is in a binary and/or other appropriate data format into one or more data fields of the transport stream(s) that is(are) capable of carrying metadata. For example, the metadata embedder 135 can insert ID3 tag metadata corresponding to the metering metadata into the transport stream(s) that is (are) to stream the media in accordance with the HLS or other appropriate streaming protocol. Additionally or alternatively, the metadata embedder 135 may embed the metadata into an external metadata channel, such as by encoding the metadata into an M3U8 or other data file that is to be associated with (e.g., included in, appended to, sent prior to, etc.) the transport stream(s) that are to provide the streaming media to the client device 160.

The media transmitter 140 of the illustrated example of FIG. 1 is implemented by a logic circuit such as a processor executing instructions, but could additionally or alternatively be implemented by an analog circuit, ASIC, DSP, FPGA, and/or other circuitry. In some examples, the transcoder 130, the media identifier 125, the metadata embedder 135, and the media transmitter 140 are implemented by the same physical processor.

The media transmitter 140 of the illustrated example employs any appropriate technique(s) to select and/or stream the media to a requesting device, such as the client device 160. For example, the media transmitter 140 of the illustrated example selects media that has been identified by the media identifier 125, transcoded by the transcoder 130 and undergone metadata embedding by the metadata embedder 135. The media transmitter 140 then streams the media to the client device 160 via the network 150 using HLS or any other streaming protocol.

In some examples, the media identifier 125, the transcoder 130, and/or the metadata embedder 130 prepare media for streaming regardless of whether (e.g., prior to) a request is received from the client device 160. In such examples, the already-prepared media is stored in a data store of the service provider 120 (e.g., such as in a flash memory, magnetic media, optical media, etc.). In such examples, the media transmitter 140 prepares a transport stream for streaming the already-prepared media to the client device 160 when a request is received from the client device 160. In other examples, the media identifier 125, the transcoder 130, and/or the metadata embedder 130 prepare the media for streaming in response to a request received from the client device 160.

The example network 150 of the illustrated example is the Internet. Additionally or alternatively, any other network(s) communicatively linking the service provider 120 and the client device such as, for example, a private network, a local area network (LAN), a virtual private network (VPN), etc. may be used. The network 150 may comprise any number of public and/or private networks using any type(s) of networking protocol(s).

The client device 160 of the illustrated example of FIG. 1 is a computing device that is capable of presenting streaming media provided by the media transmitter 140 via the network 150. The example client device 160 of the illustrated example is capable of directly presenting media (e.g., via a display) while, in other examples, the client device 160 presents the media on separate media presentation equipment (e.g., speakers, a display, etc.). Thus, as used herein a "client device" may or may not be able to present media without assistance from a second device. Client devices are typically consumer electronics devices. For example, the client device 160 of the illustrated example is a tablet such as an Apple iPad®, and thus, is capable of directly presenting media (e.g., via an integrated display and speakers). While in the illustrated example, a tablet is shown, any other type(s) and/or number(s) of client device(s) may additionally or alternatively be used. For example, Internet-enabled mobile handsets (e.g., a smartphone, an iPod®, etc.), video game consoles (e.g., any generation of Xbox®, PlayStation®, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

Client devices such as the client device 160 of FIG. 1 traditionally include a browser 165 for displaying media. A browser is an application for retrieving and displaying websites and media associated therewith. When retrieving and displaying websites, the browser 165 may execute scripts such as, for example, JavaScript. The scripts are provided as part of, and/or are referenced, by the website. In some examples, the scripts executed by the browser 165 cause the browser to store information in association with the domain of the website. For example, the scripts can cause the browser 165 to store information as a cookie. In some such examples, every time that the browser retrieves the website, the cookie is sent to the location from which the website is requested. However, only cookies associated with a domain of the requested website are transmitted. For example, cookies for the domain "xyz.com" are not transmitted when requesting "abc.com." Sometimes, when requesting an Internet resource at a first location (e.g., a URL), the browser may receive a response from a server at the first location that the browser should re-direct the request to a second location. In examples disclosed herein, the response is implemented using a Hypertext Transfer Protocol (HTTP) redirect message. However, any other way of redirecting a browser to a second location may additionally or alternatively be used.

The example database proprietor 180, 182 of the illustrated example of FIG. 1 are implemented by a server hosted by an entity having a database identifying demographics of a set of individuals. The server cooperates with the audience measurement entity to collect and return media presentation information and demographic information associated therewith. The example database proprietor 180, 182 includes entities such as wireless service carriers, mobile software/service providers, social networking sites (e.g., Facebook, Twitter, LinkedIn, Google, etc.), online retailer sites (e.g., Amazon.com, Buy.com, etc.), and/or any other Internet site that maintains user registration records (e.g., Yahoo!, MSN, Apple iTunes, Experian, etc.) While in the illustrated example of FIG. 1 there are two database proprietors, there may be any number of database proprietors. The database proprietors 180, 182 provide services to large numbers of users. In exchange for the provision of the service, the users register with the proprietor. As part of this registration, the users provide detailed demographic information such as, for example, their home mailing address, their credit score, their race and/or ethnicity, their age, their yearly income, etc. The database proprietors, as part of the use of the provided service (e.g., a social networking service, a shopping service, a news service, etc.) have access to set and/or collect cookies stored by a browser accessing their domain (e.g., the Facebook.com domain) and, therefore, can identify users of the service when the user transmits a request to the database proprietor 180, 182 by retrieving the cookies from the user device. Although this example speaks of cookies, any other type of user identifier may be employed.

The central facility 170 of the audience measurement entity of the illustrated example of FIG. 1 includes an interface to receive reported metering information (e.g., metadata) from the browser 165 of the client device 160 and/or the database proprietor 180, 182, via the network 150. In the illustrated example, the central facility 170 includes an HTTP interface to receive HTTP requests that include the metering information. Additionally or alternatively, any other method(s) to receive metering information may be used such as, for example, an HTTP Secure protocol (HTTPS), a file transfer protocol (FTP), a secure file transfer protocol (SFTP), etc.

In the illustrated example, the central facility 170 instructs the metadata embedder 135 and/or, more generally, the service provider 120 to embed a tag in media to be streamed. In the illustrated example, the tag is formatted as an ID3 tag. For example, the tag may be formatted as a JavaScript instruction. However, any other format of tag and/or instructions may additionally or alternatively be used. In some examples, the metadata embedder 135 is provided to the service provider 120 by the audience measurement entity.

In the illustrated example, the central facility 170 stores and analyzes metering information received from a plurality of different client devices and/or from the database proprietor(s) 180, 182. For example, the central facility 170 may sort and/or group metering information by media provider 110 (e.g., by grouping all metering data associated with a particular media provider 110). Any other processing of metering information may additionally or alternatively be performed. In the illustrated example, the central facility 170 is associated with an audience measurement company and is not involved with the delivery of media to the client device.

Although the following examples refer to an audience measurement entity, any monitoring entity may fill this role. FIG. 1 is a block diagram of an example system constructed in accordance with the teachings of this disclosure to monitor media presentations. In the illustrated example of FIG. 1, to track media impressions on a client device 160, an audience measurement entity (AME) partners with or cooperates with the service provider to create a website that includes monitoring instructions. In the illustrated example, the AME provides a software development kit (SDK) to the service provider 120. The SDK of the example of FIG. 1 is a set of development tools (e.g., libraries (e.g., dynamically linked libraries (DLLs)), application programming interfaces (APIs), instructions, JavaScript files, etc.) that enable the service provider 120 to integrate monitoring instructions into the website transmitted to the client device 160. In examples disclosed herein, the monitoring instructions enable identification of media presented at the client device 160, as well as identification of the user device and/or demographics of the corresponding user via interaction with a database provider.

As disclosed herein, the media monitoring instructions include instructions (e.g., Java, JavaScript, or any other computer language or script) that, when executed by the browser 165 and/or, more generally, the client device 160, cause the client device 160 to collect and/or otherwise identify the media presented by the browser 165 and/or the client device 160, and to collect one or more user identifiers 166A, 166B (e.g., cookies). The user identifiers 166A, 166B of the illustrated example include identifiers that can be used by corresponding ones of the partner database proprietors 180, 182 to identify the user or users of the client device 160, and to locate user information corresponding to the user(s). For example, the user identifiers 166A, 166B may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), cookies, etc. In some examples, fewer or more user identifiers 166A, 166B may be used. The user identifiers 166A, 166B and the media identifying metadata are transmitted in a request to a database proprietor 180, 182. The request is referred to as a dummy request in that it is not actually requesting information (e.g., a webpage), but rather is a vehicle for conveying monitoring information (e.g., the user identifier(s) 166A, 166B, the media-identifying metadata, etc.). In addition, although only two database proprietors 180, 182 are shown in FIGS. 1 and/or 2, the AME may partner with any number (e.g., 1, 2, 3, 4, etc.) of partner database proprietors to collect distributed media monitoring information. In examples disclosed herein, the database proprietors 180, 182 collect and/or establish the user identifiers 166A, 166B when, for example, a user of the client device 160 uses a service provided by the database proprietor 180, 182.

In the illustrated example, the client device 160 requests media from the service provider 120 (line 185). The media may be an advertisement, video, audio, text, a graphic, a web page, news, educational media, entertainment media, or any other type of media. In the illustrated example, service provider 120 replies to the request with the media (line 186). The reply from the service provider 120 (e.g., the media) includes monitoring instructions that cause the browser to identify the media to, for example, a third party. The browser 165 then displays the media and identifies the media by accessing a media ID provided in and/or in association with the media. In examples disclosed herein, the media ID is an ID3 tag including media-identifying metadata, source-identifying metadata, a watermark, etc. At the direction of the monitoring instructions, the browser 165 then transmits a dummy request to the database proprietor 180 (line 187). In the illustrated example, a user identifier 166A (e.g., a cookie associated with the database proprietor 180) has previously been stored by the browser 165. The request to the database proprietor 180 (line 187) includes the user identifier 166A and the media identifier. In some examples, the media identifier is encrypted to prevent the database proprietor 180, 182 from identifying the media. The encrypted media identifier may later be decrypted by the central facility 170. The database proprietor 180 then determines that it can identify the user based on the user identifier 166A, stores a record of the media presentation, and sends an acknowledgement to the client device 160 (line 188). At a later time, the database proprietor 180 transmits the record of the media presentation to the central facility 170 (line 194) and, in return, receives an acknowledgement message (line 195). The record of the media presentation includes the media-identifying metadata (which may be encrypted). In some examples, the media identifying metadata of the record is formatted as an ID3 tag. Based on the received record, the central facility 170 and/or, more generally, the AME, may report on presentation metrics for different media.

Figure 2:
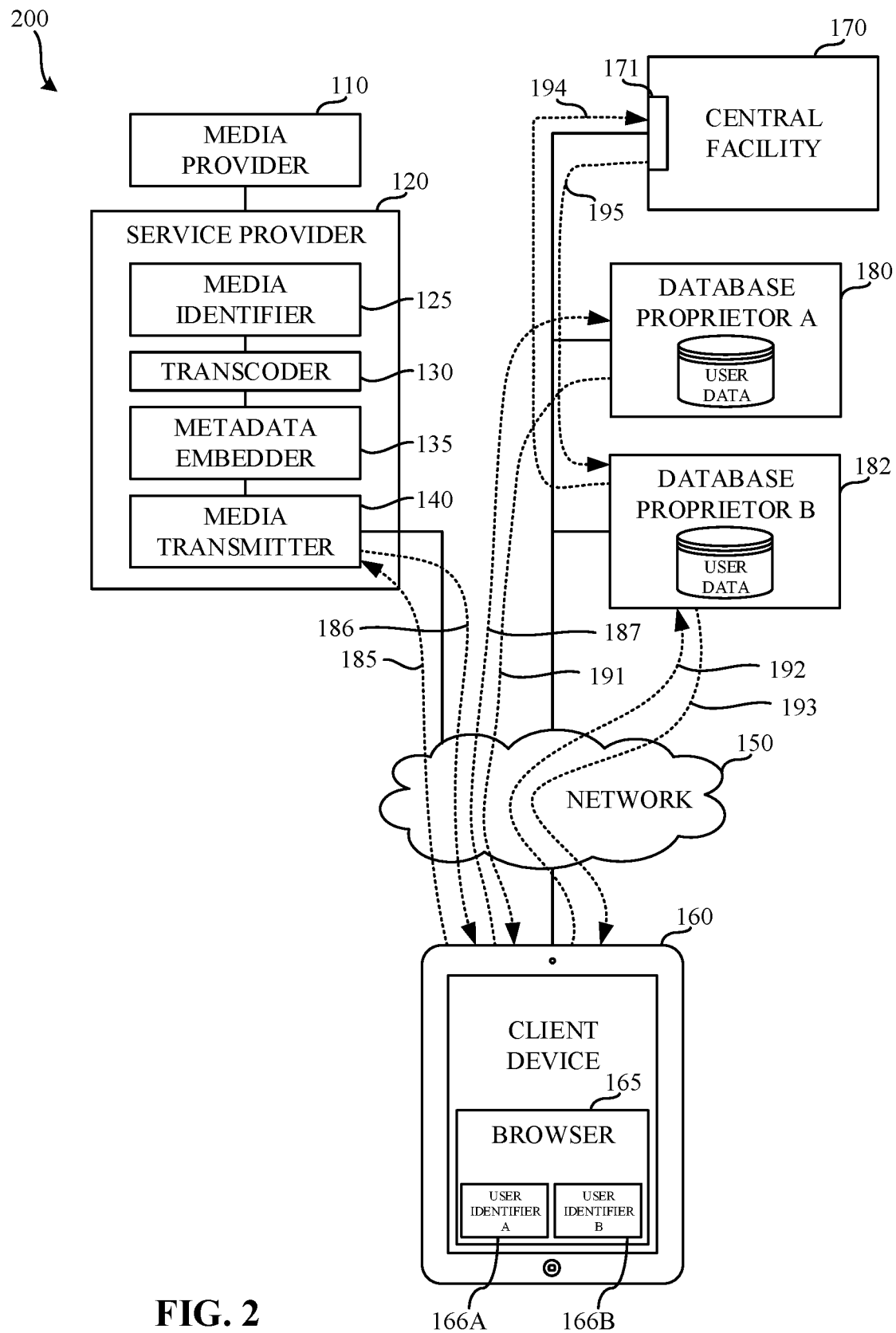
FIG. 2 depicts an alternative example system that may be used to determine exposure to streaming media.

FIG. 2 represents an alternative example system that may be used to determine exposure to streaming media. In the illustrated example of FIG. 2, the browser 165 and/or, more generally, the client device 160 requests media from the service provider 120 (line 185). The media is returned to the browser 165 (line 186). At the direction of the monitoring instructions, the browser then transmits a request and accompanying user identifier 166A to the first database proprietor 180 (line 187). In the illustrated example of FIG. 2, the database proprietor is not able to identify a user associated with the user identifier 166A (and/or no user identifier is included in the request). In response, the database proprietor 180 transmits an HTTP redirect message to the browser 165. The browser 165 follows the redirect message and transmits a request to the second database proprietor 182 identifying the media, along with the user identifier 166B stored in association with the second database proprietor 182. The second database proprietor inspects the user identifier 166B, stores the user identifier in association with the media identifier, and, being able to identify a user associated with the user identifier 166B, transmits an acknowledgement to the browser 165 (line 193). The second database proprietor 182 then transmits the media monitoring information and demographic information associated with the user to the central facility (line 194), and receives an acknowledgement from the central facility 170 (line 195).

Figure 2A:
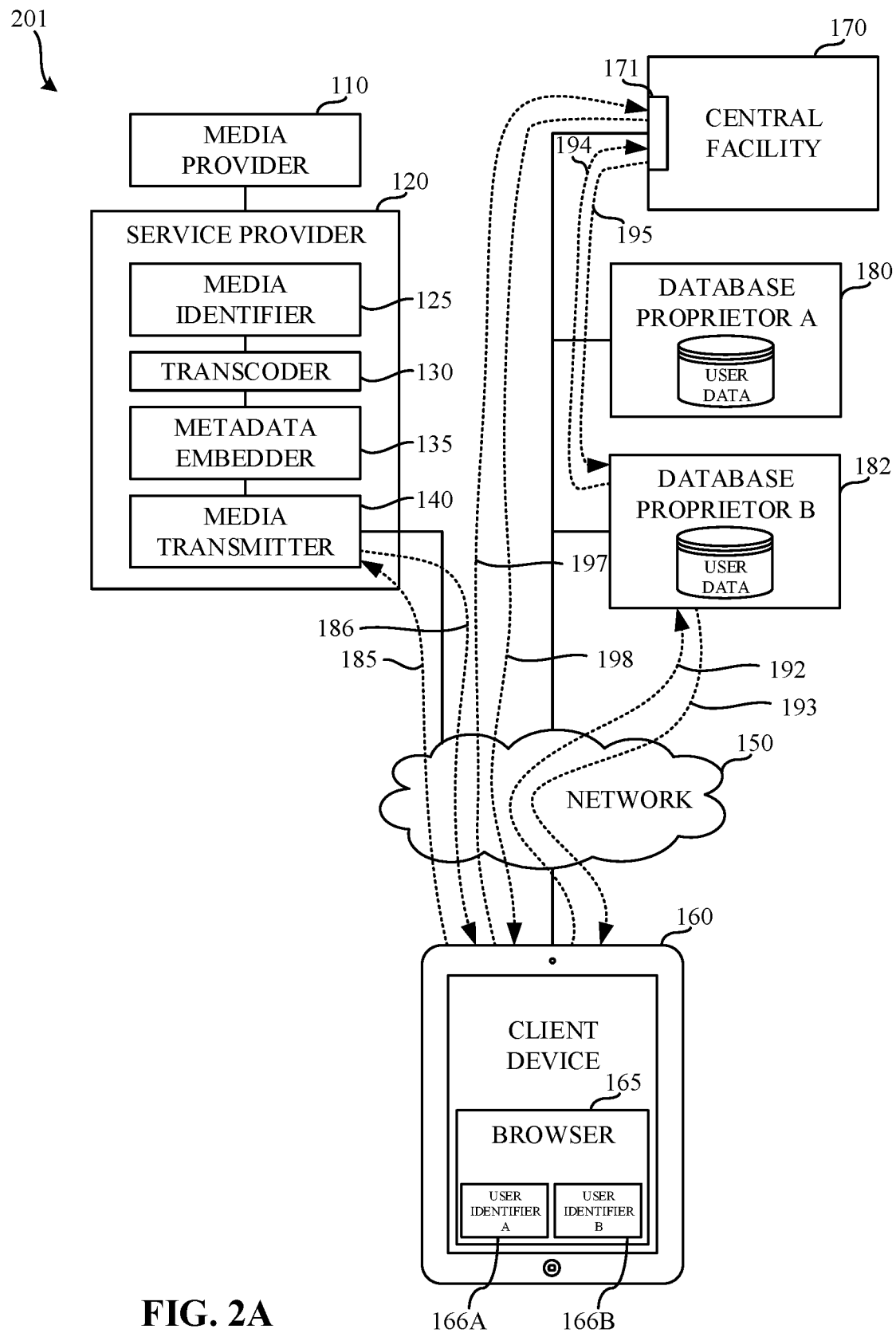
FIG. 2A depicts an alternative example system that may be used to determine exposure to streaming media.

FIG. 2A represents an alternative example system that may be used to determine exposure to streaming media. In the illustrated example of FIG. 2A, instead of transmitting a first dummy request to the database proprietor 180 (e.g., as shown by line 187 of FIG. 2), the first dummy request of FIG. 2A is transmitted to the central facility 170 (e.g., as shown by line 197 of FIG. 2A).

In the illustrated example of FIG. 2A, the first request the browser 165 and/or, more generally, the client device 160 requests media from the service provider 120 (line 185). The media is returned to the browser 165 (line 186). At the direction of the monitoring instructions (e.g., instructions located by or carried in an ID3 tag transmitted with the media), the browser then transmits a request and accompanying user identifier 166A to the central facility 170 (line 197). In the illustrated example of FIG. 2, the central facility 170 is not able to identify a user associated with the user identifier 166A (and/or no user identifier is included in the request). In response, the central facility 170 transmits an HTTP redirect message to the browser 165 (line 198).

Like the example database proprietor 180 of FIG. 2, the example central facility 170 of FIG. 2A receives dummy requests from the browser 165 and, in some examples, replies to the browser 165 with a redirection message. The browser 165 follows the redirect message and transmits a request to the database proprietor 182 identifying the media, along with the user identifier 166B stored in association with the database proprietor 182. The database proprietor inspects the user identifier 166B, stores the user identifier in association with the media identifier, and, being able to identify a user associated with the user identifier 166B, transmits an acknowledgement to the browser 165 (line 193). The database proprietor 182 then transmits the media monitoring information and demographic information associated with the user to the central facility 170 (line 194), and receives an acknowledgement from the central facility 170 (line 195).

While in the illustrated examples of FIGS. 1, 2, and/or 2A, only two database proprietors are shown, any number of database proprietors may additionally or alternatively be used. Furthermore, while a single database proprietor records the monitoring information in the illustrated example, multiple database proprietors may record such information. Recording the media-identifying information and/or demographic information associated with presentation of the media associated with the media-identifying information in multiple locations may increase the accuracy of the demographic information associated with the media presentation, may enable recordation of monitoring information that might not otherwise be recorded, etc.

Figure 3:
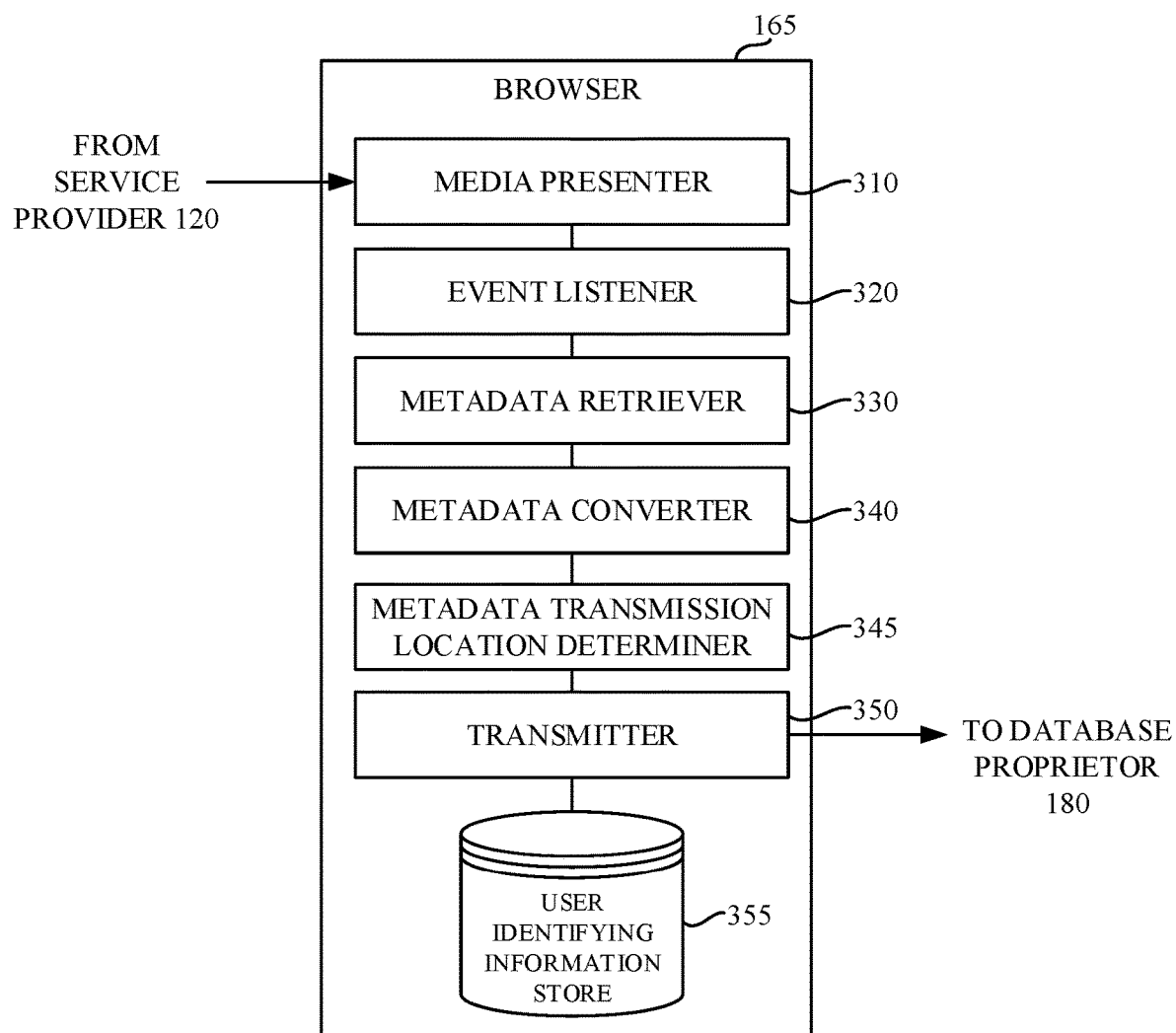
FIG. 3 is a block diagram of an example implementation of the browser of FIG. 1.

FIG. 3 is a block diagram of an example implementation of the browser 165 of FIG. 1. The browser 165 of the illustrated example of FIG. 3 includes an example media presenter 310, an example event listener 320, an example metadata retriever 330, an example metadata converter 340, an example metadata transmission location determiner 345, an example transmitter 350, and an example user identifying information store 355.

The media presenter 310 of the illustrated example of FIG. 3 is implemented by a processor executing instructions, but it could additionally or alternatively be implemented by an analog circuit, an ASIC, DSP, FPGA, and/or other circuitry. In the illustrated example, the media presenter 310 interacts with a QuickTime® application programming interface (API) to display media via the client device 160. While in the illustrated example, the QuickTime® API is used, any other media presenting framework may additionally or alternatively be employed. For example, the example media presenter 310 may interact with an Adobe® Flash® media presentation framework.

The example event listener 320 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310 and the event listener 320 are implemented by the same physical processor. In the illustrated example, the example event listener 320 interfaces with JavaScript functions to enable reception of and/or listening for an event notification. An event notification is any notification of activity within the browser and/or application. Event notifications may be triggered when, for example, a new webpage is loaded, media is presented, a user input is detected, etc. While JavaScript is used to listen for event notifications in the illustrated example, any other framework, such as, for example, ActiveX, Microsoft Silverlight, etc., may be used to listen for event notifications.

The metadata retriever 330 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310, the event listener 320, and the metadata retriever 330 are implemented by the same physical processor. In the illustrated example, the metadata retriever 330 retrieves metadata from the media presenter 310 upon detection of an event notification by the event listener 320. In the illustrated example, the metadata retriever 330 retrieves the metadata by inspecting a document object model (DOM) object of the media presenter 310 using JavaScript. While JavaScript is used to retrieve the DOM object in the illustrated example, any other framework, such as, for example, ActiveX, Microsoft Silverlight, etc., may be used to retrieve the DOM object. In some examples, the metadata retriever 330 retrieves operational information about the media presenter 310 and/or, more generally, the browser 165. The retrieved operational information may include, for example, information about whether the media presenter 310 is fully or partially visible (e.g., the media presenter 310 is fully viewable, the media presenter 310 is 50% viewable, the media presenter 310 is not viewable, etc.), information about whether the media presenter 310 is in the foreground or background, etc. In some examples, the operational information is transmitted to the audience measurement entity to enable computation of additional media presentation metrics (e.g., whether users listen to streaming audio with the media presenter 310 in the background, etc.).

The metadata converter 340 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310, the event listener 320, the metadata retriever 330, and the metadata converter 340 are implemented by the same physical processor. In the illustrated example, the metadata converter 340 converts the metadata retrieved by the metadata retriever 330 into a format for transmission to the database proprietor 180, 182. For example, the metadata converter 340 may encrypt, decrypt, compress, modify, etc., the metadata and/or portions of the metadata to, for example, reduce the amount of data to be transmitted to the database proprietor 180, 182. In some examples, the metadata converter 340 encrypts the media-identifying metadata to prevent the database proprietor 180, 182 from identifying the media. In such an example, the database proprietor 180, 182 transmits demographic information in association with the encrypted media-identifying metadata to the central facility 170. The central facility 170 (e.g., the audience measurement entity) decrypts the encrypted media-identifying metadata to identify the presented media.

The metadata transmission location determiner 345 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310, the event listener 320, the metadata retriever 330, the metadata converter 340, and the metadata transmission location determiner 345 are implemented by the same physical processor. In the illustrated example, the metadata transmission location determiner 345 inspects the metadata and/or information transmitted with the metadata to determine where to transmit a dummy request carrying the metadata and any associated user-identifying information (e.g., the user identifiers 166A, 166B). In the illustrated example, the metadata is transmitted as an ID3 tag. In some such examples, the ID3 tag includes a destination to which the dummy request should be transmitted. In the illustrated example, the destination is a universal resource locator (URL) that includes the media-identifying information as well as specifying the Internet domain where it should be transmitted (e.g., databaseproprietor.com/<media-identifying information>). However, in some examples, the destination and the media-identifying information are transmitted separately. In such an example, the metadata transmission location determiner 345 determines a URL based on the destination and the media-identifying information.

In some examples, different service providers implement the monitoring instructions to specify the destination (e.g., the specific database proprietor) where the media-identifying information is to be transmitted. Different service providers may, accordingly, be associated with different database proprietors. Associations with different database proprietors may result in a more efficient and/or more accurate recordation of media impressions and association of those impressions with demographic information. For example, users who view media at a financial website may be more readily identifiable by a database proprietor associated with financial services (e.g., a stock broker, a credit bureau, Experian, etc.) than a database proprietor associated with social media (e.g., Facebook, Twitter, etc.). Therefore, a service provider may create the monitoring instructions to cause the client device to send a dummy request to a specific database proprietor (e.g., Experian) that matches the media to be annotated.

In the illustrated example, a destination field of the ID3 tag conveying the media-identifying metadata includes a destination field that, when interpreted by the monitoring instructions, causes the monitoring instructions to send the dummy request to the specified destination (e.g., a URL). In such an example, at the direction of the monitoring instructions, the client device determines the location to send the dummy request based on the destination field of the ID3 tag. Such an example of determining where to send the dummy request based on the destination field of the ID3 tag is disclosed in connection with blocks 810 and 815 of FIG. 8. Alternatively, the monitoring instructions for a given service provider may direct the client device to send the dummy request to a pre-determined location. That is, rather than determining the location based on the destination field of the ID3 tag, the location is based on an instruction of the monitoring instructions. In some examples, the instruction is a JavaScript instruction implemented by the metadata transmission location determiner 345. An example of determining where to send the dummy request based on an instruction of the monitoring instructions is disclosed in connection with blocks 820 and 825 of FIG. 8.

The transmitter 350 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310, the event listener 320, the metadata retriever 330, the metadata converter 340, the metadata transmission location determiner 345, and the transmitter 350 are implemented by the same physical processor. In the illustrated example, the transmitter 350 transmits the media-identifying information and/or the user-identifying information (e.g., the user identifiers 166A, 166B) to the database proprietor 180, 182 via, for example, the Internet. While the media-identifying information is transmitted in substantially real-time in the illustrated example, in some examples, the media-identifying information is stored, cached, and/or buffered before being transmitted to the database proprietor 180, 182. Also, while the media-identifying information is transmitted to the database proprietor 180, 182 in the illustrated example, in some examples, the media-identifying information is transmitted to a different destination such as, for example, the central facility 170. Additionally or alternatively, the transmitter 350 may transmit a user identifier 166A, 166B of the browser 165 and/or the client device 160 to enable the database proprietor 180, 182 to correlate the media presentation with a user, a demographic, etc. In some examples, the media-identifying information is encrypted before transmission by the transmitter 350. Encrypting the media-identifying information prevents the database proprietor 180, 182 from gaining access to information about what media is identified. In some examples, the transmitter 350 transmits the operational information retrieved by the metadata retriever 330 along with the media-identifying information.

The user-identifying information store 355 of the illustrated example is implemented by a memory for storing information (e.g., user-identifying information, cookies, etc.) The example user-identifying information store 355 of the illustrated example of FIG. 3 may be any device for storing data such as, for example, flash memory, magnetic media, optical media, etc. In the illustrated example, the user-identifying information store 355 is implemented by random access memory of the client device 160. Furthermore, the data stored in the user-identifying information store 355 may be in any data format such as, for example, binary data, comma delimited data, tab delimited data, structured query language (SQL) structures, etc. While in the illustrated example the user-identifying information store 355 is illustrated as a single database, the user-identifying information store 355 may be implemented by multiple databases, and/or be stored in multiple memory locations of the media device. In the illustrated example, each piece of user identifying information is stored in association with a domain. When requests (e.g., the dummy request of line 187 of FIG. 1) are transmitted, only the user-identifying information associated with the destination domain is sent.

Figure 4:
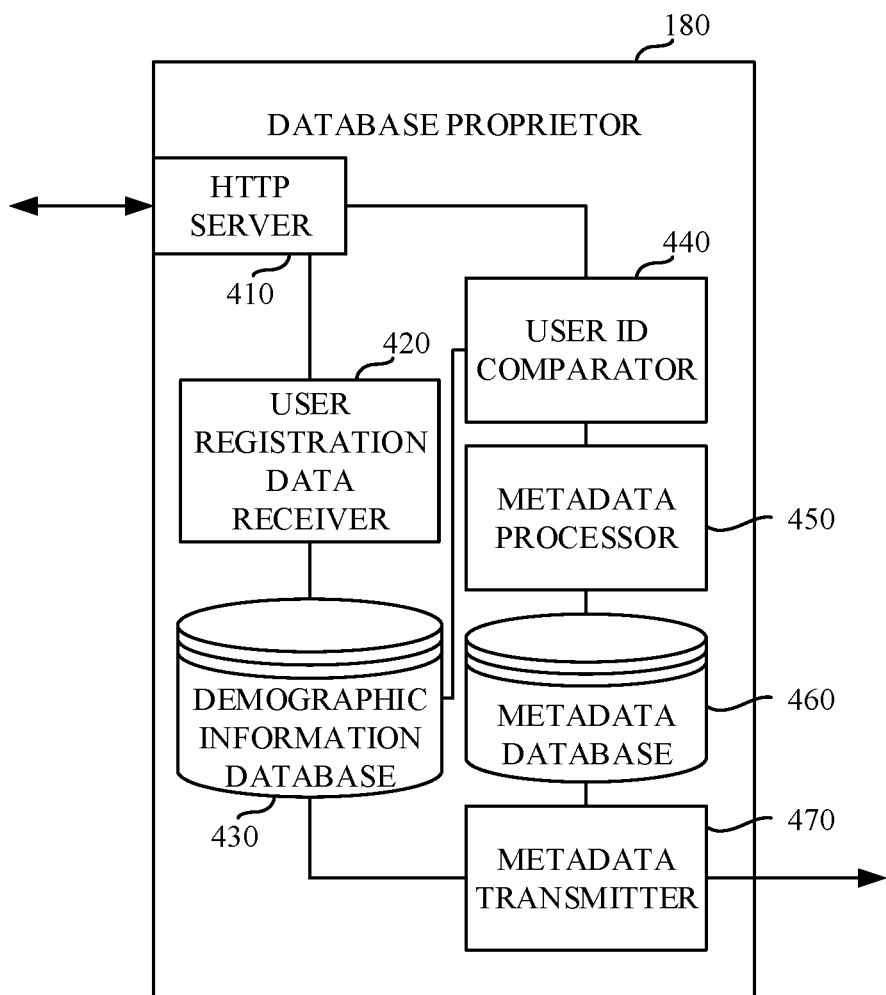
FIG. 4 is a block diagram of an example implementation of the database proprietor of FIG. 1.

FIG. 4 is a block diagram of an example implementation of the database proprietor 180, 182 of FIGS. 1, 2, and/or 2A. The database proprietor 180, 182 of the illustrated example of FIG. 4 includes an HTTP server 410, a user registration data receiver 420, a demographic information database 430, a user ID comparator 440, a metadata processor 450, metadata database 460, and a metadata transmitter 470.

The HTTP server 410 of the illustrated example of FIG. 4 is implemented by a processor executing instructions, but it could additionally or alternatively be implemented by an analog circuit, an ASIC, DSP, FPGA, and/or other circuitry. In the illustrated example, the example HTTP server 410 receives requests from the browser 165 that include, for example, the user identifiers 166A, 166B, and/or the media identifying information (which may be encrypted) identified by the browser 165. The example HTTP server 410 of FIG. 4 responds to the requests from the browser 165 with an HTTP acknowledge message and/or an HTTP redirect message. While in the illustrated example, the HTTP server 410 communicates using the HTTP protocol, any other protocol may additionally and/or alternatively be used such as, for example, the HTTPS protocol, the FTP protocol, etc.

The user registration data receiver 420 of the illustrated example of FIG. 4 is implemented by a processor executing instructions, but it could additionally or alternatively be implemented by an analog circuit, an ASIC, DSP, FPGA, and/or other circuitry. In some examples, the user registration data receiver 420 and the HTTP server 410 are implemented by the same physical processor. In the illustrated example, the example user registration data receiver 420 receives registration data from the user of the client device 160. The registration data may include, for example, demographic information, a username, geographic information, and/or any other information associated with the user. In the illustrated example, the user registration data receiver 420 receives the registration information from the user via the HTTP server 410. That is, the registration information is received via a network such as, for example, the Internet. However, the user information may be received in any other fashion. For example, the user registration data may be received via a telephone call, facsimile transmission, manual entry, etc. the user registration data receiver 420 of the illustrated example of FIG. 4 stores the user registration data in the demographic information database 430.

The demographic information database 430 of the illustrated example is implemented by a memory for storing user registration data (e.g., demographic information associated with users). The example demographic information database 430 of the illustrated example of FIG. 4 may be any device for storing data such as, for example, flash memory, magnetic media, optical media, etc. In the illustrated example, the demographic information database 430 is implemented by random access memory of the database proprietor 180, 182. Furthermore, the data stored in the demographic information database 430 may be in any data format such as, for example, binary data, comma delimited data, tab delimited data, structured query language (SQL) structures, etc. While in the illustrated example the demographic information database 430 is illustrated as a single database, the demographic information database 430 may be implemented by multiple databases, and/or be stored in multiple memory locations of the database proprietor 180, 182.

The user ID comparator 440 of the illustrated example of FIG. 4 is implemented by a processor executing instructions, but it could additionally or alternatively be implemented by an analog circuit, an ASIC, DSP, FPGA, and/or other circuitry. In some examples, the example user ID comparator 440, the example HTTP server 410, and the example user registration data receiver 420 are implemented by the same physical processor. In the illustrated example, the user ID comparator 440 receives the dummy request from the browser 165 via the HTTP server 410 (e.g., the dummy request of line 187 of FIG. 1). The dummy request may include the user identifier 168A, 166B. Accordingly the user ID comparator 440 inspects the request to determine whether the user identifier is present, and/or, if present, whether the user identifier can be used to determine a user ID. If the user cannot be identified (e.g., the user identifier is unknown or is not present), the user ID comparator 440 signals to the HTTP server 410 that the browser 165 should be redirected to a different location (e.g., the database proprietor 182, the central facility 170). If the user can be identified, the user ID comparator 440 communicates the media-identifying metadata (which may be encrypted) and the user ID to the metadata database 460.

The metadata processor 450 of the illustrated example of FIG. 4 is implemented by a processor executing instructions, but it could additionally or alternatively be implemented by an analog circuit, an ASIC, DSP, FPGA, and/or other circuitry. In some examples, the metadata processor 450, the example HTTP server 410, the example user registration data receiver 420, and the example user ID comparator 440 are implemented by the same physical processor. In the illustrated example, the metadata processor 450 stores the user ID identified by the user ID comparator 440 in association with the media identifying metadata (which may be encrypted) in the metadata database 460.

The metadata database 460 is implemented by a memory for storing media-identifying metadata received from the browser via the dummy request (e.g., the request represented by line 187 of FIG. 1). The example metadata database 460 of the illustrated example of FIG. 4 may be implemented by any device for storing data such as, for example, flash memory, magnetic media, optical media, etc. In the illustrated example, the metadata database 460 is implemented by random access memory of the database proprietor 180, 182. Furthermore, the data stored in the metadata database 460 may be in any data format such as, for example, binary data, comma delimited data, tab delimited data, structured query language (SQL) structures, etc. While in the illustrated example the metadata database 460 is illustrated as a single database, the metadata database 460 may be implemented by multiple databases, and/or be stored in multiple memory locations of the database proprietor 180, 182. Furthermore, while in the illustrated example the metadata database 460 and the demographic information database 430 are implemented as separate databases, the example metadata database 460 and the example demographic information database 430 may be implemented using a single (i.e., the same) database.

The metadata transmitter 470 of the illustrated example of FIG. 4 is implemented by a processor executing instructions, but it could additionally or alternatively be implemented by an analog circuit, an ASIC, DSP, FPGA, and/or other circuitry. In some examples, the example metadata transmitter 470, the example HTTP server 410, the example user registration data receiver 420, the example user ID comparator 440, and the example metadata processor 450 are implemented by the same physical processor. In the illustrated example, the metadata transmitter 470 transmits demographic information associated with users to which media (identified by the media identifying metadata) was presented to the central facility 170. In the illustrated example, the metadata transmitter 470 transmits demographic information and the associated media-identifying metadata (which may be encrypted) when the media has been presented to a threshold number of users. As such, the demographic information is aggregated across the users to which the media was presented. However, in some examples, demographic information is transmitted on an individual basis. In the illustrated example, the metadata transmitter 470 transmits the data to the central facility 170 regardless of whether the central facility 170 has requested the data. However, in some examples, the central facility 170 may request the metadata transmitter 470 to transmit the data.

Figure 4A:
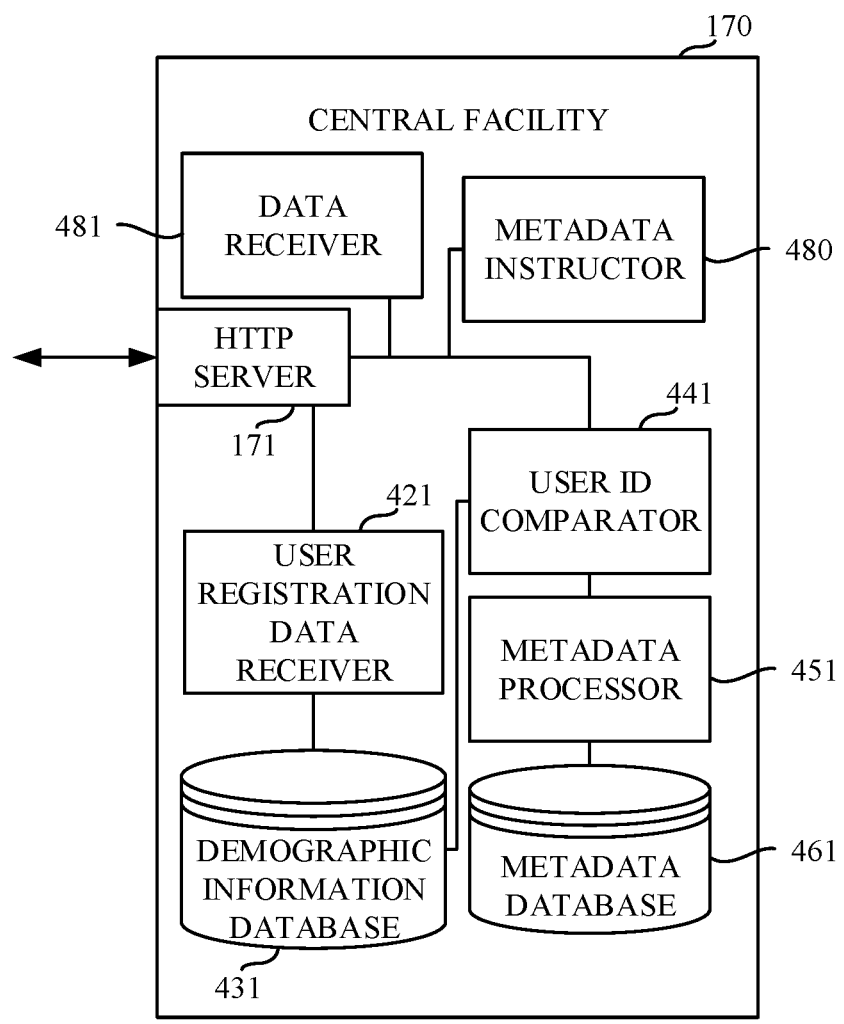
FIG. 4A is a block diagram of an example implementation of the central facility of FIG. 1.

FIG. 4A is a block diagram of an example implementation of the central facility 170 of FIGS. 1, 2, and/or 2A. The central facility 170 of the illustrated example of FIG. 4A includes an HTTP server 171, a user registration data receiver 421, a demographic information database 431, a user ID comparator 441, a metadata processor 451, metadata database 461, a metadata instructor 480, and a data receiver 481.

The HTTP server 171 of the illustrated example of FIG. 4A is implemented by a processor executing instructions, but it could additionally or alternatively be implemented by an analog circuit, an ASIC, DSP, FPGA, and/or other circuitry. In the illustrated example, the example HTTP server 171 receives requests from the browser 165 that include, for example, the user identifiers 166A, 166B, and/or the media identifying information (which may be encrypted) identified by the browser 165. The example HTTP server 171 of FIG. 4A responds to the requests from the browser 165 with an HTTP acknowledge message and/or an HTTP redirect message. While in the illustrated example, the HTTP server 171 communicates using the HTTP protocol, any other protocol may additionally and/or alternatively be used such as, for example, the HTTPS protocol, the FTP protocol, etc.

The user registration data receiver 421 of the illustrated example of FIG. 4A is implemented by a processor executing instructions, but it could additionally or alternatively be implemented by an analog circuit, an ASIC, DSP, FPGA, and/or other circuitry. In some examples, the user registration data receiver 421 and the HTTP server 171 are implemented by the same physical processor. In the illustrated example, the example user registration data receiver 421 receives registration data from the user of the client device 160. The registration data may include, for example, demographic information, a username, geographic information, and/or any other information associated with the user. In the illustrated example, the user registration data receiver 421 receives the registration information from the user via the HTTP server 171. That is, the registration information is received via a network such as, for example, the Internet. However, the user information may be received in any other fashion. For example, the user registration data may be received via a telephone call, facsimile transmission, manual entry, etc. the user registration data receiver 421 of the illustrated example of FIG. 4A stores the user registration data in the demographic information database 431.

The demographic information database 431 of the illustrated example is implemented by a memory for storing user registration data (e.g., demographic information associated with users). The example demographic information database 431 of the illustrated example of FIG. 4A may be any device for storing data such as, for example, flash memory, magnetic media, optical media, etc. In the illustrated example, the demographic information database 431 is implemented by random access memory of the central facility 170. Furthermore, the data stored in the demographic information database 431 may be in any data format such as, for example, binary data, comma delimited data, tab delimited data, structured query language (SQL) structures, etc. While in the illustrated example the demographic information database 431 is illustrated as a single database, the demographic information database 431 may be implemented by multiple databases, and/or be stored in multiple memory locations of the central facility 170.

The user ID comparator 441 of the illustrated example of FIG. 4A is implemented by a processor executing instructions, but it could additionally or alternatively be implemented by an analog circuit, an ASIC, DSP, FPGA, and/or other circuitry. In some examples, the example user ID comparator 441, the example HTTP server 171, and the example user registration data receiver 421 are implemented by the same physical processor. In the illustrated example, the user ID comparator 441 receives the dummy request from the browser 165 via the HTTP server 411 (e.g., the dummy request of line 197 of FIG. 2A). The dummy request may include the user identifier 168A, 166B. Accordingly the user ID comparator 441 inspects the request to determine whether the user identifier is present, and/or, if present, whether the user identifier can be used to determine a user ID. If the user cannot be identified (e.g., the user identifier is unknown or is not present in the request), the user ID comparator 441 signals to the HTTP server 171 that the browser 165 should be redirected to a different location (e.g., the database proprietor 182, the central facility 170). If the user can be identified, the user ID comparator 441 communicates the media-identifying metadata (which may be encrypted) and the user ID to the metadata database 461.

The metadata processor 451 of the illustrated example of FIG. 4A is implemented by a processor executing instructions, but it could additionally or alternatively be implemented by an analog circuit, an ASIC, DSP, FPGA, and/or other circuitry. In some examples, the metadata processor 451, the example HTTP server 171, the example user registration data receiver 421, and the example user ID comparator 441 are implemented by the same physical processor. In the illustrated example, the metadata processor 451 stores the user ID identified by the user ID comparator 441 in association with the media identifying metadata (which may be encrypted) in the metadata database 461.

The metadata database 461 is implemented by a memory for storing media-identifying metadata received from the browser via the dummy request (e.g., the request represented by line 197 of FIG. 2A). Moreover, the example metadata database 461 store demographic information and metadata received from the database proprietor 180, 182 via the data receiver 481. The example metadata database 461 of the illustrated example of FIG. 4A may be implemented by any device for storing data such as, for example, flash memory, magnetic media, optical media, etc. In the illustrated example, the metadata database 461 is implemented by random access memory of the central facility 170. Furthermore, the data stored in the metadata database 461 may be in any data format such as, for example, binary data, comma delimited data, tab delimited data, structured query language (SQL) structures, etc. While in the illustrated example the metadata database 461 is illustrated as a single database, the metadata database 461 may be implemented by multiple databases, and/or be stored in multiple memory locations of the central facility 170. Furthermore, while in the illustrated example the metadata database 461 and the demographic information database 431 are implemented as separate databases, the example metadata database 461 and the example demographic information database 431 may be implemented using a single (i.e., the same) database.

The metadata instructor 480 of the illustrated example of FIG. 4A is implemented by a processor executing instructions, but it could additionally or alternatively be implemented by an analog circuit, an ASIC, DSP, FPGA, and/or other circuitry. In some examples, the metadata instructor 480, the example metadata processor 451, the example HTTP server 171, the example user registration data receiver 421, and the example user ID comparator 441 are implemented by the same physical processor. In the illustrated example, the example metadata instructor 480 of the example central facility 170 instructs the metadata embedder 135 and/or, more generally, the service provider 120 to embed a tag in media to be streamed. In the illustrated example, the metadata embedder 135 instructs the metadata embedder 135 to format the tag as an ID3 tag. The tag is to cause a client device (e.g., the browser 165 and/or more generally the client device 160) to send a message to the central facility 170.

Figure 5:
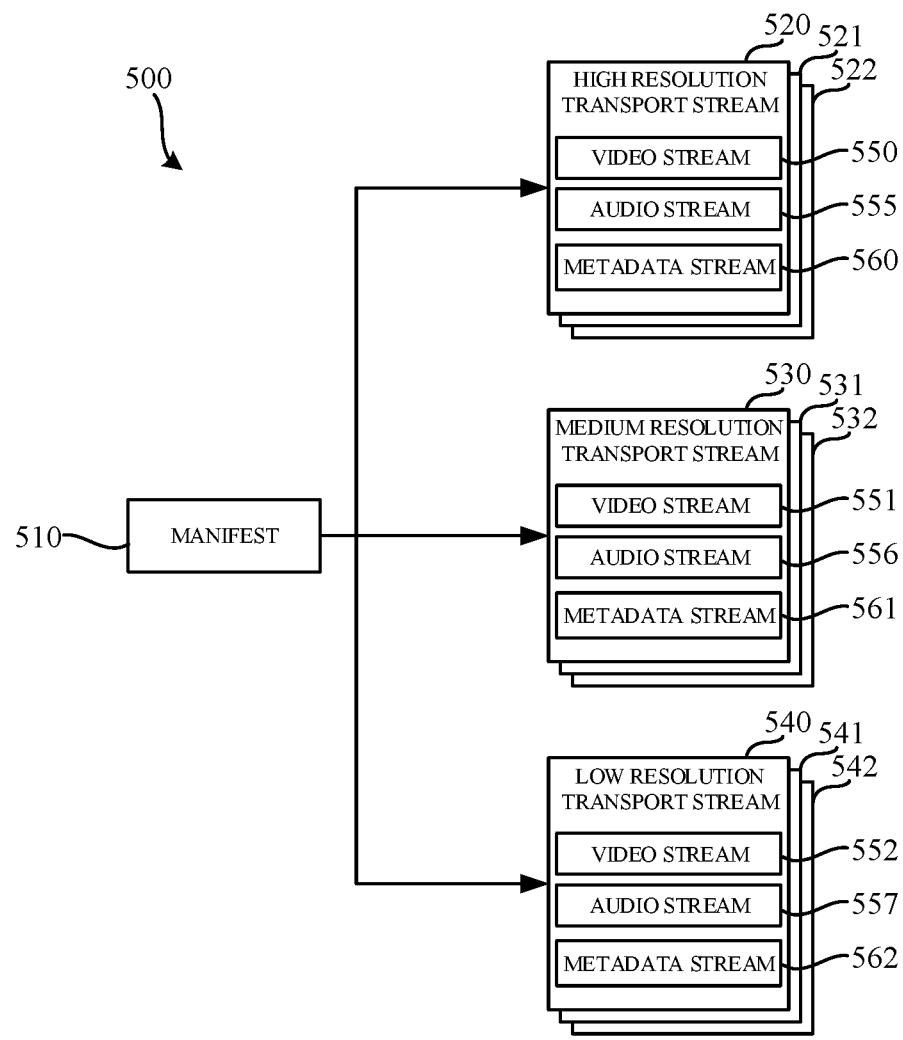
FIG. 5 is a block diagram of an example implementation of an example HLS stream that may be displayed by the example browser of FIGS. 1, 2, and/or 3.

The data receiver 481 of the illustrated example of FIG. 4A is implemented by a processor executing instructions, but it could additionally or alternatively be implemented by an analog circuit, an ASIC, DSP, FPGA, and/or other circuitry. In some examples, the data receiver 481, the example metadata processor 451, the example HTTP server 171, the example user registration data receiver 421, and the example user ID comparator 441 are implemented by the same physical processor. The example data receiver 481 of the illustrated example of FIG. 4A receives metadata and demographic information from the database proprietor 180, 182. FIG. 5 is a block diagram of an example implementation of an example HLS stream 500 that may be displayed by the example media presenter 310 of FIG. 3. In the illustrated example of FIG. 5, the HLS stream 500 includes a manifest 510 and three transport streams. In the illustrated example, the manifest 510 is an .m3u8 file that describes the available transport streams to the client device. However, any other past, present, and/or future file format may additionally or alternatively be used. In the illustrated example, the client device retrieves the manifest 510 in response to an instruction to display an HLS element.

HLS is an adaptive format, in that, although multiple devices retrieve the same manifest 510, different transport streams may be displayed depending on one or more factors. For example, devices having different bandwidth availabilities (e.g., a high speed Internet connection, a low speed Internet connection, etc.) and/or different display abilities (e.g., a small size screen such as a cellular phone, a medium size screen such as a tablet and/or a laptop computer, a large size screen such as a television, etc.) select an appropriate transport stream for their display and/or bandwidth abilities. In some examples, a cellular phone having a small screen and limited bandwidth uses a low resolution transport stream. Alternatively, in some examples, a television having a large screen and a high speed Internet connection uses a high resolution transport stream. As the abilities of the device change (e.g., the device moves from a high speed Internet connection to a low speed Internet connection) the device may switch to a different transport stream.

In the illustrated example of FIG. 5, a high resolution transport stream 520, a medium resolution transport stream 530, and a low resolution transport stream 540 are shown. In the illustrated example, each transport stream 520, 530, and/or 540 represents a portion of the associated media (e.g., five seconds, ten seconds, thirty seconds, one minute, etc.). Accordingly, the high resolution transport stream 520 corresponds to a first portion of the media, a second high resolution transport stream 521 corresponds to a second portion of the media, a third high resolution transport stream 522 corresponds to a third portion of the media. Likewise, the medium resolution transport stream 530 corresponds to the first portion of the media, a second medium resolution transport stream 531 corresponds to the second portion of the media, and a third medium resolution transport stream 532 corresponds to the third portion of the media. In addition, the low resolution transport stream 540 corresponds to the first portion of the media, a second low resolution transport stream 541 corresponds to the second portion of the media, and a third low resolution transport stream 542 corresponds to the third portion of the media. Although three transport streams are shown in the illustrated example of FIG. 5 for each resolution, any number of transport streams representing any number of corresponding portions of the media may additionally or alternatively be used.

In the illustrated example, each transport stream 520, 521, 522, 530, 531, 532, 540, 541, and/or 542 includes a video stream 550, 551, 552, an audio stream 555, 556, 552, and a metadata stream 560, 561, 562. The video stream 550, 551, and/or 552 includes video associated with the media at different resolutions according to the resolution of the transport stream with which the video stream is associated. The audio stream 555, 556, and/or 557 includes audio associated with the media. The metadata stream 560, 561, and/or 562 includes metadata such as, for example, an ID3 tag associated with the media.

In examples disclosed herein, the ID3 tag is formatted as an ID3v2 tag. However, any other type and/or format of metadata and/or metadata container may additionally or alternatively be used. In the illustrated example, the media-identifying information is stored in a private frame of the ID3 tag. However, the media-identifying information may be stored in any other location. The media-identifying information of the illustrated example includes a destination domain name and a textual version of the audio watermark identified by the media identifier 125 of FIGS. 1 and/or 2. In the illustrated example, the audio watermark is stored in a base-64 encrypted format. However, the watermark may be stored in any other fashion. Furthermore, while in the illustrated example, the ID3 tag includes the destination domain name and the audio watermark, any other information may additionally or alternatively be included in the ID3 tag such as, for example, an identifier of the media provider 110, an identifier of the service provider 120, an identifier of the central facility 170, etc.

While an example manner of implementing the example service provider 120 of FIGS. 1, 2, and/or 2A, the example browser 165 of FIGS. 1, 2, and/or 3, the example central facility 170 of FIGS. 1, 2, 2A, and/or 4A, and/or the example database proprietor 180, 182 of FIGS. 1, 2, 2A, and/or 4 are illustrated in FIGS. 1, 2, 2A, 3, 4, and/or 4A, one or more of the elements, processes and/or devices illustrated in FIGS. 1, 2, 2A, 3, 4, and/or 4A may be combined, divided, re-arranged, omitted, eliminated and/or implemented in any other way. Further, the example media identifier 125, the example transcoder 130, the example metadata embedder 135, the example media transmitter 140 and/or, more generally, the example service provider 120 of FIGS. 1 2, and/or 2A; the example media presenter 310, the example event listener 320, the example metadata retriever 330, the example metadata converter 340, the example metadata transmission location determiner 345, the example transmitter 350, the example user identifying information store 355, and/or, more generally the example browser 165 of FIGS. 1, 2, 2A, and/or 3; the example HTTP server 171, the example user registration data receiver 421, the example demographic information database 431, the example user ID comparator 441, the example metadata processor 451, the example metadata database 461, the example metadata instructor 480, the example data receiver 481, and/or, more generally, the example central facility 170 of FIGS. 1, 2, 2A, and/or 4A; and/or the example HTTP server 410, the example user registration data receiver 420, the example demographic information database 430, the example user ID comparator 440, the example metadata processor 450, the example metadata database 460, the example metadata transmitter 470, and/or, more generally, the example database proprietor 180, 182 of FIGS. 1, 2, 2A, and/or 4 may be implemented by hardware, software, firmware and/or any combination of hardware, software and/or firmware. Thus, for example, any of the example media identifier 125, the example transcoder 130, the example metadata embedder 135, the example media transmitter 140 and/or, more generally, the example service provider 120 of FIGS. 1, 2, and/or 2A; the example media presenter 310, the example event listener 320, the example metadata retriever 330, the example metadata converter 340, the example metadata transmission location determiner 345, the example transmitter 350, the example user identifying information store 355, and/or, more generally the example browser 165 of FIGS. 1, 2, 2A, and/or 3; the example HTTP server 171, the example user registration data receiver 421, the example demographic information database 431, the example user ID comparator 441, the example metadata processor 451, the example metadata database 461, the example metadata instructor 480, the example data receiver 481, and/or, more generally, the example central facility 170 of FIGS. 1, 2, 2A, and/or 4A; and/or the example HTTP server 410, the example user registration data receiver 420, the example demographic information database 430, the example user ID comparator 440, the example metadata processor 450, the example metadata database 460, the example metadata transmitter 470, and/or, more generally, the example database proprietor 180, 182 of FIGS. 1, 2, 2A, and/or 4 could be implemented by one or more analog or digital circuit(s), logic circuits, programmable processor(s), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example media identifier 125, the example transcoder 130, the example metadata embedder 135, the example media transmitter 140 and/or, more generally, the example service provider 120 of FIGS. 1, 2, and/or 2A; the example media presenter 310, the example event listener 320, the example metadata retriever 330, the example metadata converter 340, the example metadata transmission location determiner 345, the example transmitter 350, the example user identifying information store 355, and/or, more generally the example browser 165 of FIGS. 1, 2, 2A, and/or 3; the example HTTP server 171, the example user registration data receiver 421, the example demographic information database 431, the example user ID comparator 441, the example metadata processor 451, the example metadata database 461, the example metadata instructor 480, the example data receiver 481, and/or, more generally, the example central facility 170 of FIGS. 1, 2, 2A, and/or 4A; and/or the example HTTP server 410, the example user registration data receiver 420, the example demographic information database 430, the example user ID comparator 440, the example metadata processor 450, the example metadata database 460, the example metadata transmitter 470, and/or, more generally, the example database proprietor 180, 182 of FIGS. 1, 2, 2A, and/or 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example service provider 120 of FIGS. 1, 2, and/or 2A, the example browser 165 of FIGS. 1, 2, 2A, and/or 3, the example central facility 170 of FIGS. 1, 2, 2A, and/or 4A, and/or the example database proprietor 180, 182 of FIGS. 1, 2, 2A, and/or 4 may include one or more elements, processes and/or devices in addition to, or instead of, those illustrated in FIGS. 1, 2, 2A, 3, 4, and/or 4A, and/or may include more than one of any or all of the illustrated elements, processes and devices.

Flowcharts representative of example machine readable instructions for implementing the example service provider 120 of FIGS. 1, 2, and/or 2A, the example browser 165 of FIGS. 1, 2, 2A, and/or 3, the example central facility 170 of FIGS. 1, 2, 2A, and/or 4A, and/or the example database proprietor 180, 182 of FIGS. 1, 2, 2A, and/or 4 are shown in FIGS. 6, 7, 8, 9, 10, and/or 11. In these examples, the machine readable instructions comprise a program(s) for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart(s) illustrated in FIGS. 6, 7, 8, 9, 10, and/or 11, many other methods of implementing the example service provider 120 of FIGS. 1, 2, and/or 2A, the example browser 165 of FIGS. 1, 2, 2A, and/or 3, the example central facility 170 of FIGS. 1, 2, 2A, and/or 4A, and/or the example database proprietor 180, 182 of FIGS. 1, 2, 2A, and/or 4 may alternatively be used. For example, the order of execution of the blocks may be changed, and/or some of the blocks described may be changed, eliminated, or combined.

As mentioned above, the example processes of FIGS. 6, 7, 8, 9, 10, and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 6, 7, 8, 9, 10, and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 6:
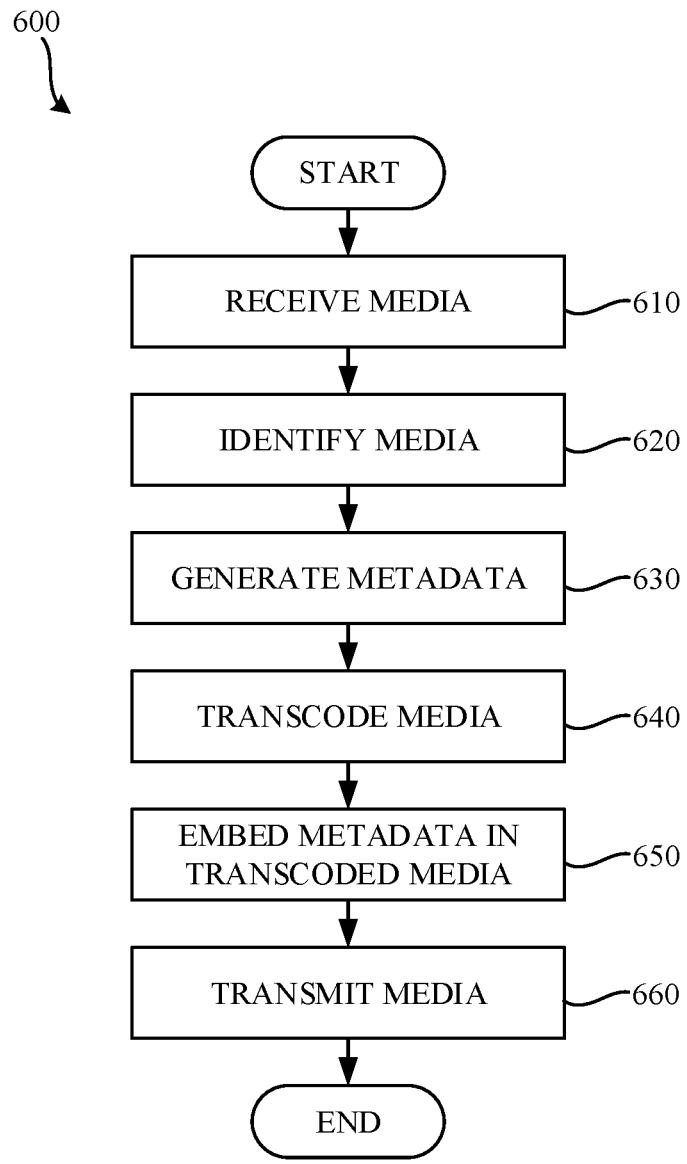
FIG. 6 is a flowchart representative of example machine-readable instructions which may be executed to implement the example service provider of FIGS. 1 and/or 2.

FIG. 6 is a flowchart representative of example machine-readable instructions 600 which may be executed to implement the example service provider 120 of FIGS. 1 and/or 2. Execution of the example machine-readable instructions 600 of FIG. 6 begins with the media identifier 125 of the service provider 120 receiving the media from the media provider 110 (block 610). In the illustrated example, the media is received as it is broadcast (e.g., live). However, in some examples, the media is stored and/or cached by the media identifier 125.

The media identifier 125 of the illustrated example then identifies the media (block 620). The media identifier 125 identifies the media by extracting metering data (e.g., signatures, watermarks, etc.) from the media. Based on the extracted metering data, the media identifier 125 generates metadata (block 630). In the illustrated example, the metadata is generated in an ID3 format. However, any other metadata format may additionally or alternatively be used. Further, in the illustrated example, the metadata is generated based on the extracted metering data. However, in some examples, the metadata may be generated by querying an external source using some or all of the extracted metering data.

The media is then transcoded by the transcoder 130 of the service provider 120 (block 640). In the illustrated example, the media is transcoded into an MPEG2 transport stream that may be transmitted via HTTP live streaming (HLS). The metadata embedder 135 of the service provider 120 embeds the metadata into the media (block 650). In some examples, the metadata is encrypted prior to being embedded into the media. In the illustrated example, the metadata is embedded into a metadata channel of the media. However, in some examples, the metadata may be embedded in an ancillary data document, file, etc. that may be associated with the media. For example, the metadata may be embedded in a manifest file (e.g., an M3U8 file), in a text track associated with the media, etc.

The media is then transmitted by the media transmitter 140 of the service provider 120 (block 660). In the illustrated example, the media is transmitted using HTTP live streaming (HLS). However, any other format and/or protocol for transmitting (e.g., broadcasting, unicasting, multicasting, etc.) media may additionally or alternatively be used.

Figure 7:
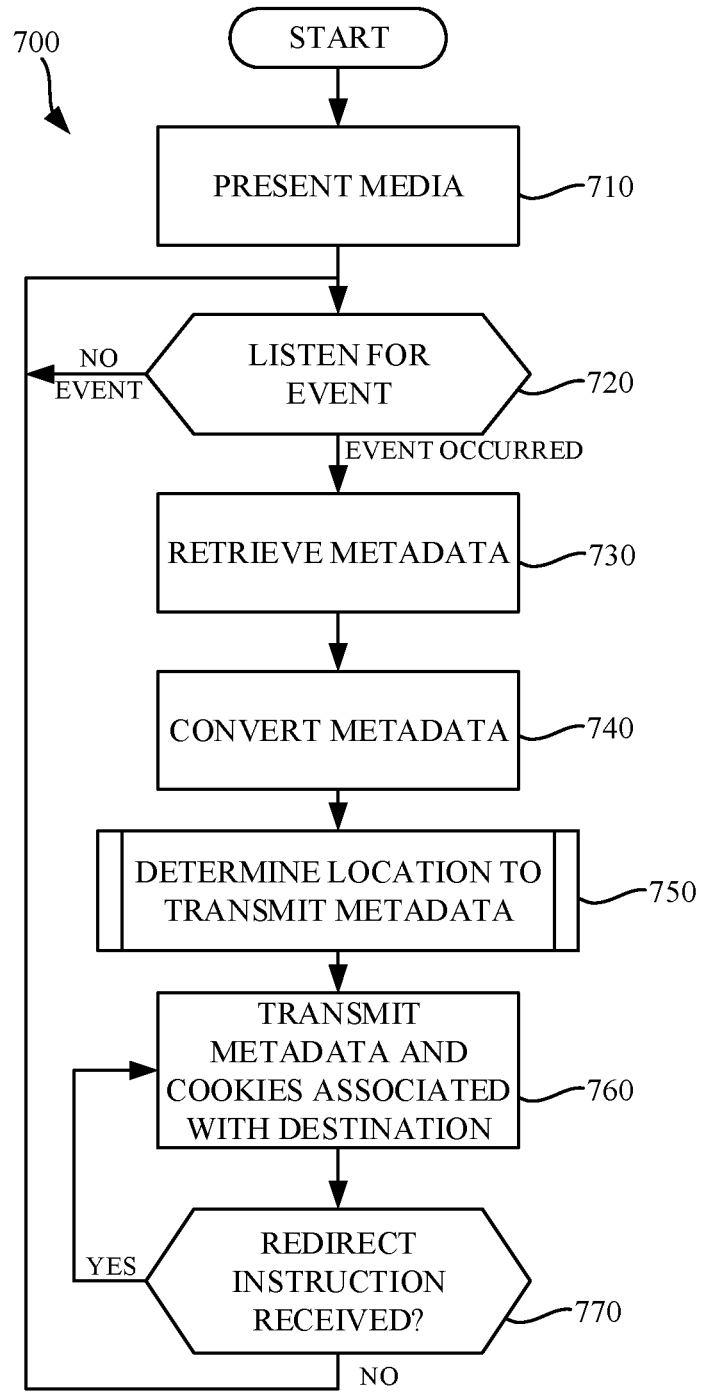
FIGS. 7 and 8 are flowcharts representative of example machine-readable instructions which may be executed to implement the example browser of FIGS. 1, 2, and/or 3.

FIG. 7 is a flowchart representative of example machine-readable instructions 700 which may be executed to implement the example browser 165 of FIGS. 1, 2, and/or 3. Execution of the example machine-readable instructions 700 of FIG. 7 begins with the browser 165 being instantiated (e.g., by being loaded by the client device 160). The media presenter 310 of the browser 165 then begins presenting media (block 710) by, for example, loading a display object for presentation via the client device 160. In the illustrated example, the display object is a QuickTime® object. However, any other type of display object may additionally or alternatively be used.

The event listener 320 of the browser 165 begins listening for an event (block 720). In the illustrated example, the event listener 320 listens for a JavaScript event triggered by the media presenter 210. However, in some examples, the event listener 320 listens for any other event(s) such as, for example, a media change event, a user interaction event (e.g., when a user clicks on an object), a display event (e.g., a page load), etc. If the event listener 320 does not detect an event, the event listener 320 continues to listen for the event until, for example, the browser 165 is closed, a different webpage is loaded, etc.

If the event listener 320 detects an event, the metadata retriever 330 of the browser 165 retrieves the metadata (block 730). In the illustrated example, the event listener 320 passes an event object to the metadata retriever 330, which inspects the event object to retrieve the metadata. However, in some examples, the event listener 320 passes an identifier of an object (e.g., the media presenter 310 display object), which indicates the object from which the metadata retriever 330 is to retrieve metadata. In the illustrated example, the metadata retriever 330 inspects a document object module (DOM) object to retrieve the metadata. However, in some examples, the metadata retriever 330 inspects, for example, a timed text track, a metadata stream of the HLS media, etc. to retrieve the metadata. In the illustrated example, the metadata is formatted as an ID3 tag. However, any other format of metadata may additionally or alternatively be used. In some examples, the metadata retriever 330 retrieves operational information about the media presenter 310 and/or, more generally, the browser 165. The retrieved operational information may include, for example, information about whether the media presenter 310 is fully or partially visible (e.g., the media presenter 310 is fully viewable, the media presenter 310 is 50% viewable, the media presenter 310 is not viewable, etc.), information about whether the media presenter 310 is in the foreground or background, etc.

The metadata converter 340 of the browser 165 then converts the metadata (block 740) into a format for use by the transmitter 350 of the browser 165. In the illustrated example, the metadata is converted from a binary data format into a text format. In some examples, the metadata is parsed to identify portions (e.g., fields, sections, etc.) of interest of the metadata (e.g., a genre, an artist, a song title, an album name, a transmitting station/server site, etc.). In some examples, the metadata converter 340 encrypts the metadata. Encrypting the metadata prevents third parties (e.g., the database proprietor) from identifying the media, while still permitting logging of impressions for association with demographics. In the illustrated example, the metadata converter 340 adds a timestamp to the metadata prior to transmitting the metadata to the database proprietor 180, 182. Timestamping (e.g., recording a time that an event occurred) enables accurate identification and/or correlation of media that was presented and/or the time that it was presented with the user(s) of the presentation device.

In some examples, the metadata may not undergo conversion before transmission by the transmitter (e.g., the metadata may be sent in the format in which it is retrieved by the metadata retriever 330). In such examples, the database proprietor 180, 182, and/or the central facility 170 converts the metadata by, for example, converting the metadata to a different format, parsing the metadata to identify portions of interest of the metadata, decrypting the metadata, etc. Conversion of the metadata by the database proprietor 180, 182, and/or the central facility 170 facilitates correlation of the media that was presented with an identifier identifying to whom the media was presented. In some examples, the database proprietor 180, 182, and/or the central facility 170 timestamps the metadata upon receipt. Timestamping the metadata enables accurate identification and/or correlation of media that was presented and/or the time that it was presented with the user(s) of the presentation device.

The metadata transmission location determiner 345 of the browser 165 then determines a location to which the metadata should be transmitted (block 750). In the illustrated example, the location is determined based on a domain name included in the ID3 tag. However, any other way of determining a location to transmit metadata may additionally or alternatively be used. An example process for determining the location to transmit the metadata is disclosed in connection with FIG. 8, below.

The transmitter 350 then transmits the metadata to the location identified by the metadata transmission location determiner 345 (block 750). In the illustrated example, the metadata is transmitted using an HTTP Post request. However, any other method of transmitting data and/or metadata may additionally or alternatively be used. For example, a file transfer protocol (FTP) instruction, an HTTP Get request, an Asynchronous JavaScript and extensible markup language (XML) (AJAX) message, etc., may be used to transmit the metadata. In some examples, the metadata is not transmitted to the database proprietor 180, 182, and/or the central facility 170. For example, the metadata may be transmitted to a display object of the client device 160 for display to a user. In the illustrated example, the metadata is transmitted in real-time (e.g., streamed) to the database proprietor 180, 182. However, in some examples, the metadata may be stored (e.g., cached, buffered, etc.) for a period of time before being transmitted to the database proprietor 180, 182. In some examples, the transmitter 350 transmits the operational data retrieved by the metadata retriever 330 from the media presenter 310. Transmitting the operational information enables the audience measurement entity to compute additional media presentation metrics (e.g., whether users listen to streaming audio with the media presenter 310 in the background, etc.).

Figure 8:
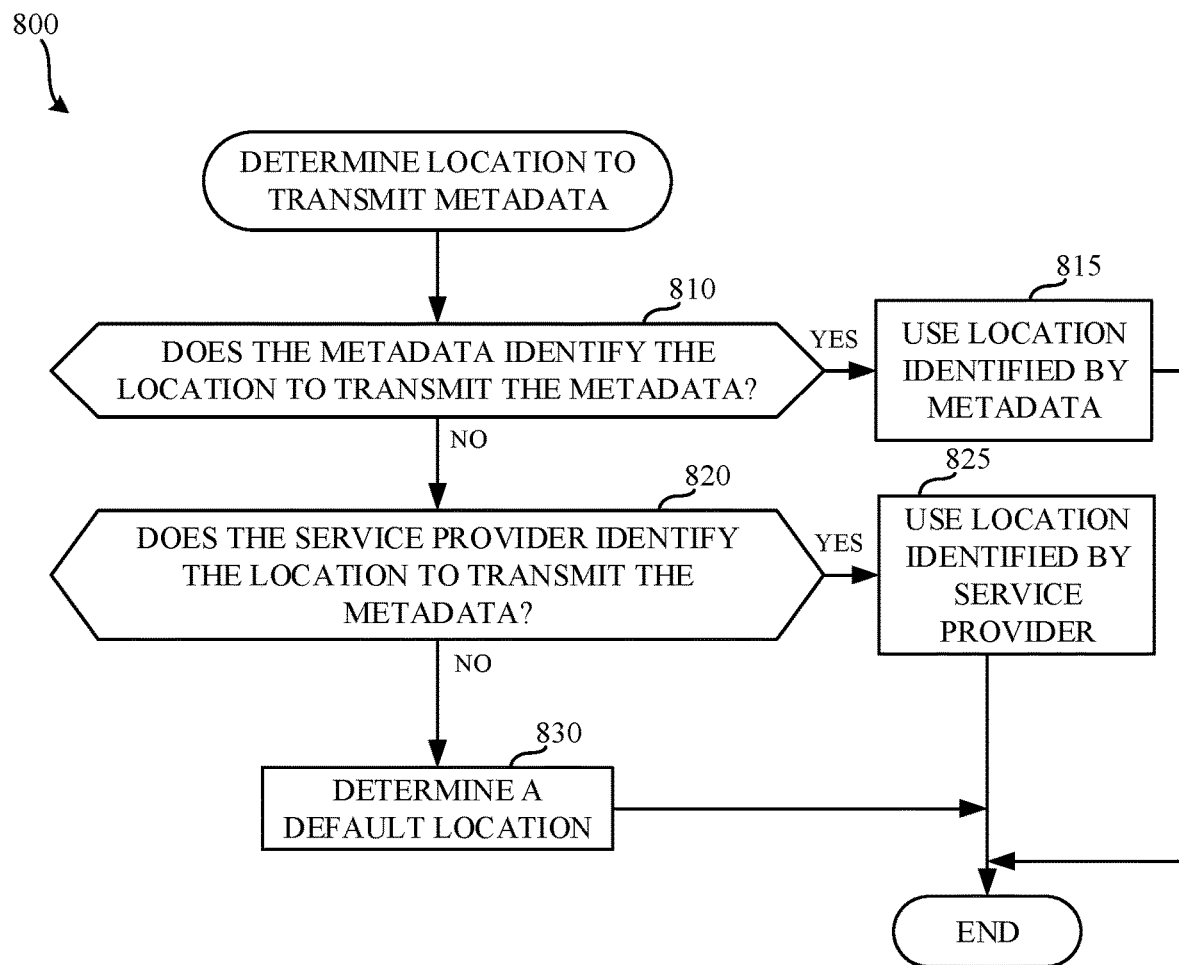

FIG. 8 is a flowchart representative of example machine-readable instructions 800 which may be executed to implement the example browser 165 of FIGS. 1, 2, and/or 3. The example flowchart of FIG. 8 represents a process wherein the metadata transmission location determiner 345 of FIG. 3 determines a destination to transmit metadata and/or user identifier data via, for example, the dummy request (e.g., line 187 of FIG. 1). Execution of the example machine-readable instructions 800 of FIG. 8 begins when the metadata transmission location determiner 345 determines whether the metadata included in the ID3 tag identified by the metadata retriever 330 of FIG. 3 identifies a location to transmit the metadata (block 810). In some examples, the ID3 tag includes a URL specifying where the metadata should be transmitted. The URL may identify, for example, a preferred database proprietor 180, 182. If the ID3 tag includes a URL specifying where the metadata should be transmitted (block 810), the metadata transmission location determiner 345 uses the location (e.g., the URL) identified by the metadata (block 815) to determine the destination of the dummy request.

However, in some examples, the ID3 tag does not identify the location to transmit the metadata. If the ID3 tag does not identify the location to transmit the metadata (block 810), the example metadata transmission location determiner 345 determines whether the service provider identifies the location transmit the metadata (block 820). In some examples, the service provider 120, when implementing the SDK associated with the monitoring instructions implemented by the browser 165, specifies a database proprietor to which the metadata should be transmitted. In such an example, the metadata transmission location determiner 345 uses the location identified by the service provider (block 825) to determine the destination of the dummy request.

In some examples, neither the metadata nor the service provider may identify the location where the metadata should be transmitted (blocks 810, 820). In such an example, the metadata transmission location determiner 345 uses a default location to transmit the metadata (block 830) to determine the destination of the dummy request. The default location may be, for example, a preferred database proprietor such as, for example Facebook, Twitter, Experian, etc. In some examples, the default location may be the central facility 170. The example machine-readable instructions 800 of FIG. 8 then terminate, and the transmitter 350 of FIG. 3 proceeds to transmit the metadata and user identifier associated with the destination via the dummy request (block 760 of FIG. 7).

Figure 9:
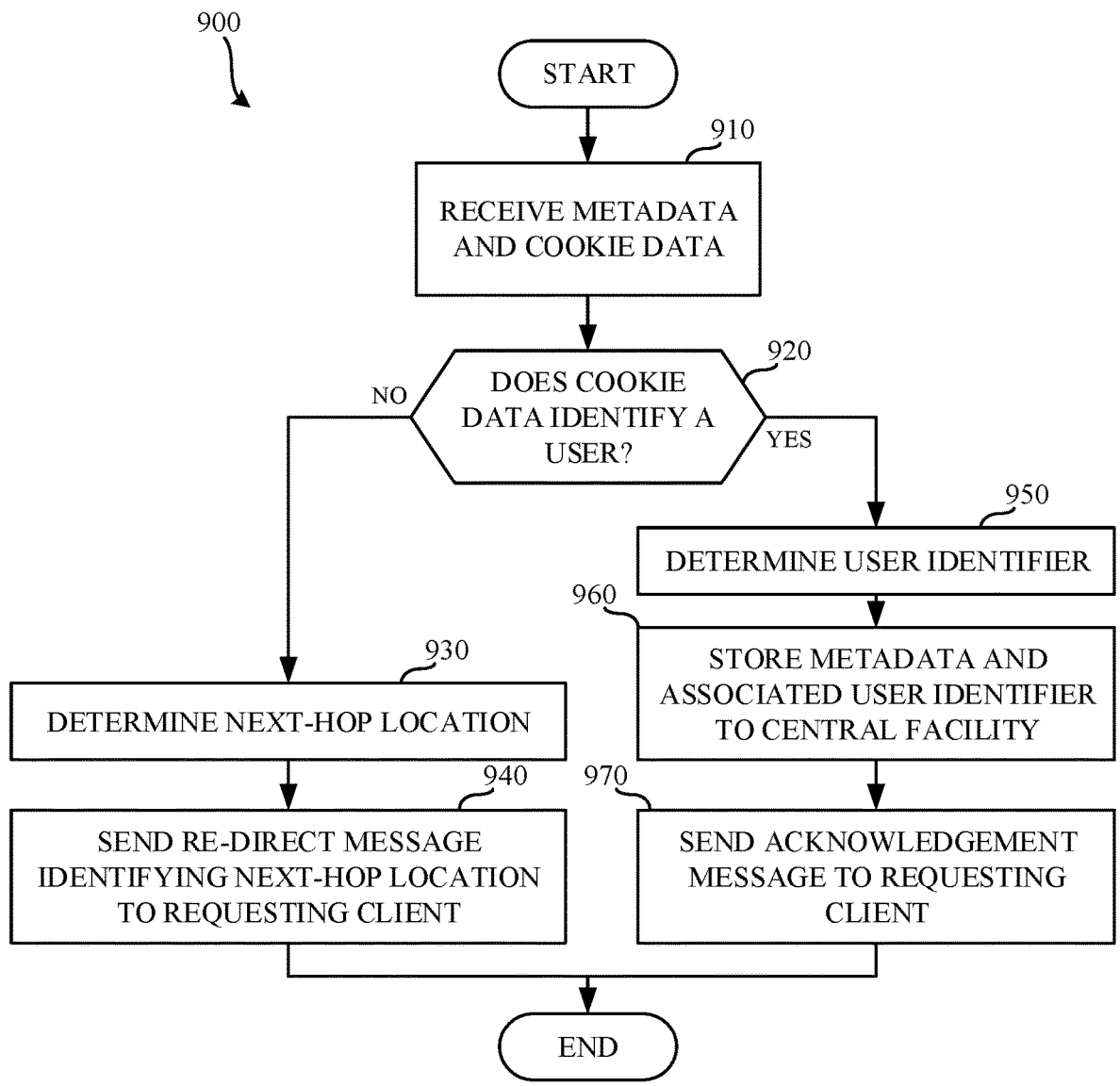
FIGS. 9 and 10 are flowcharts representative of example machine-readable instructions which may be executed to implement the example database proprietor of FIGS. 1, 2, 2A, and/or 4.

FIG. 9 is a flowchart representative of example machine-readable instructions 900 which may be executed to implement the example database proprietor 180, 182 of FIGS. 1, 2, 2A, and/or 4. In some examples, the example instructions 900 of the illustrated example of FIG. 9 may be executed to implement the example central facility 170 of FIGS. 1, 2, 2A, and/or 4A. Execution of the example machine-readable instructions 900 of FIG. 9 begins when the HTTP server 410 of the database proprietor 180 of FIG. 4 receives a dummy request from the browser (e.g. the dummy request 187 of FIG. 1) (block 910). The dummy request includes media identifying metadata, and may additionally include user-identifying data such as, for example, the user identifier 166A, 166B. Based on the received user identifier and/or the absence of user identifier, the user ID comparator 440 determines whether the user identifier 168A, 166B identifies a user known to the database proprietor 180 (block 920). To make such a determination, the user ID comparator 440 may query the demographic information database 430 to determine whether a user identifier and/or any other information associated with the cookie 166A, 166B can be used to identify the user. If the cookie data cannot be used to identify the user (block 920), the user ID comparator 440 determines a next hop location to which the browser 165 should be directed (block 930). The next hop location may be, for example, a different database proprietor 182, the central facility 170, etc. For example, in the illustrated example of FIG. 2, the database proprietor A 180 cannot identify the user and, accordingly, identifies the database proprietor B 182 as the next hop location. Using the next hop location, the HTTP server 410 sends a redirect message to the browser 165 identifying the next hop location (block 940). Again referring to FIG. 2, the redirect message is represented by line 191. In some examples, the browser 165 may be directed to multiple database proprietors (e.g., a first database proprietor redirects the browser to a second database proprietor, which redirects the browser to a third database proprietor, etc.).

If the user identifier data can be used to identify the user (block 920), the user ID comparator 440 determines the user identifier (block 950). The metadata processor 450 then stores the received metadata and the associated user identifier in the metadata database 460. (block 960). In the illustrated example, the metadata processor 450 stores the media identifying metadata (e.g., the ID3 tag) and the user identifier. When storing the metadata and the user identifier, the metadata processor 450 may store an impression record in a similar fashion to, for example, the table 1070 of FIG. 10A. In some examples, the metadata processor 450 stores a timestamp to facilitate identification of the time of presentation of the media.

The HTTP server 410 then transmits an acknowledgment message to the requesting client (block 970). Transmitting the acknowledgment message notifies the requesting client (e.g., the browser 165) that no further action need be taken with respect to the dummy request. In some examples, the database proprietor 180 sends a redirect message instructing the browser 165 to contact a second database proprietor 182 even if the database proprietor 180 was able to identify the user. Such redirection may enable different database proprietors, who may store different types of demographic data (e.g., financial data, geographic data, etc.), to collect a larger data set of demographic data than could be collected by a single database proprietor.

Figure 10:
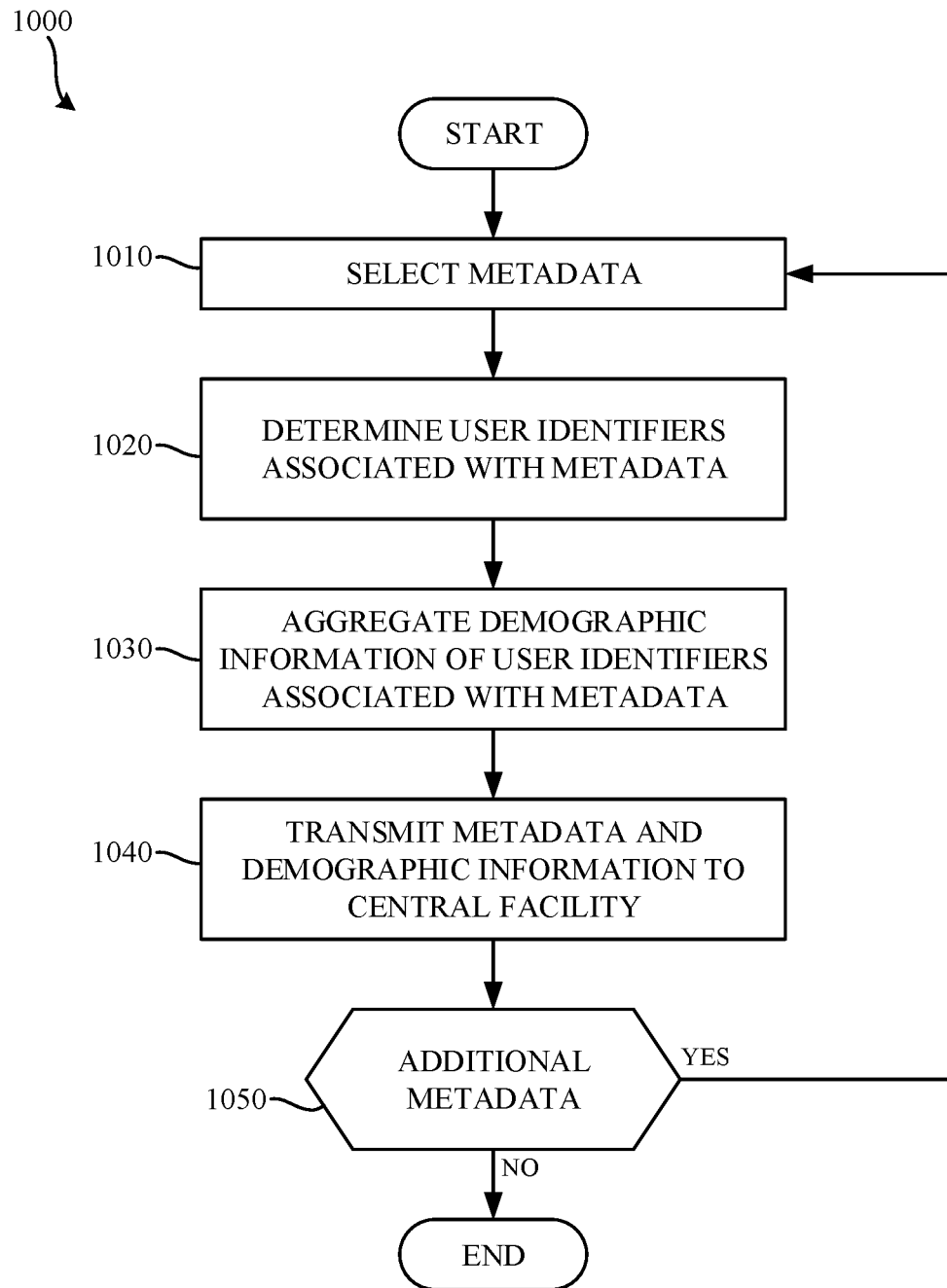

FIG. 10 is a flowchart representative of example machine-readable instructions 1000 which may be executed to implement the example database proprietor 180, 182 of FIGS. 1, 2, 2A, and/or 4. Execution of the example machine-readable instructions 1000 of FIG. 10 begins when the metadata processor 450 selects metadata stored in the metadata database 460 that is associated with a threshold number of users (e.g., twenty users, one hundred users, etc.) (block 1010). The impression data may be formatted in a similar fashion to, for example, the impression records shown in the example table 1070 of FIG. 10A. The metadata processor 450 then determines user identifiers associated with the selected metadata (block 1020). Based on the identified user identifiers, the metadata processor 450 aggregates demographic information associated with the identified user identifiers (block 1030). The demographic information may be stored in a similar fashion to, for example, the demographic information shown in the example table 1080 of FIG. 10B. The aggregated demographic information is transmitted in association with the selected metadata (e.g., the ID3 tag) to the central facility 170 by the metadata transmitter 470 (block 1040). The aggregated demographic information and media identifier may be transmitted to the central facility in a format similar to, for example, the example table 1089 of FIG. 10C. The metadata processor 450 then determines whether additional metadata is stored in the metadata database that meets the threshold requirements for transmission to the central facility 170 (block 1050). If additional metadata exists, the metadata processor selects the metadata (block 1010). If no additional metadata exists, the process terminates. While in the illustrated example of FIG. 10 demographic information is transmitted to the central facility 170 independent of a request from the central facility 170, in some examples, the central facility 170 may request demographic information associated with particular metadata from the database proprietor 180.

FIG. 10 A is a table 1070 representative of impression data recorded by the example database proprietor 180. The example table 1070 includes a first column 1071 for storing a media identifier (e.g., an ID3 tag), a second column 1072 for storing a user identifier, and a third column 1073 for storing a timestamp. While in the illustrated example, three columns are shown, any other columns for storing any other information may additionally or alternatively be used such as, for example, a column for storing an Internet Protocol address of the client device, a column for storing a service provider identifier, etc.

In the illustrated example of FIG. 10A, the example table 1070 includes a first row 1074 of impression data, a second row 1075 of impression data, a third row 1076 of impression data, a fourth row 1077 of impression data, and a fifth row 1078 of impression data. However, any other number of records may additionally or alternatively be stored. For example, the example table may include ten thousand rows of data corresponding to ten thousand recorded impressions. In the illustrated example of FIG. 10A, the first example row 1074 identifies that a first media was presented to a first user (e.g., media 0001 was presented to user A). The second example row 1075 identifies that the first media was presented to a second user. The third example row 1076 identifies that the first media was presented to a third user. The fourth example row 1077 identifies that a second media was presented to the first user. The fifth example row 1078 identifies that the second media was presented to a fourth user. In some examples, the media identifier (e.g., media 0001) is encrypted so that the database proprietor can determine that the media identifier corresponds to the same media but cannot determine the identity of the media.

FIG. 10B is a table 1080 representative of demographic information stored by the database proprietor 180. The example table 1080 includes a first column 1082 storing the user identifier (e.g., the user identifier of the first column 1072 of FIG. 10A), a second column 1083 storing first demographic information (e.g., an age), and a third column 1085 storing second demographic information (e.g., an income). While in the illustrated example of FIG. 10B there are two columns storing demographic information, any other number of columns storing any other information may additionally or alternatively be used. For example, additional columns storing other demographic information (e.g., ethnicity, mailing address, sex, etc.) may be used. Additionally or alternatively, columns storing user information (e.g., a user account creation date, a "last accessed" date, user preferences, etc.) may be used.

In the illustrated example, four user records are shown. A first user record 1085 represents user A. A second user record 1086 represents user B. A third user record 1087 represents user C. A fourth record 1087 represents user D. While in the illustrated example of FIG. 10B, four user records are shown, any other number of records may additionally or alternatively be used. For example, the database proprietor may store fifty thousand records respectively associated with fifth thousand users.

FIG. 10C is a table 1089 representative of aggregated media presentation information as transmitted to the central facility 170 by the database proprietor 180. As described in connection with FIG. 10, the database proprietor aggregates demographic information (e.g., the demographic information of the example table 1080 of FIG. 10B in association with the media impression data of the example table 1070 of FIG. 10A). The example table 1089 represents aggregated demographic data showing a number of impressions associated with various demographics and different media identifiers.

The example table 1089 of FIG. 10C includes a first column 1090 representing the media identifier. The example table 1089 includes a second column representing a count (e.g., a sum) of the number of users exposed to the media identified by the media identifier of the first column 1090 who are under the age of twenty. The example table 1089 includes a third column representing a count (e.g., a sum) of the number of users exposed to the media identified by the media identifier of the first column 1090 who are between the ages of twenty and forty. The example table 1089 includes a fourth column representing a count (e.g., a sum) of the number of users exposed to the media identified by the media identifier of the first column 1090 who are between the ages of forty and sixty. The example table 1089 includes a fifth column representing a count (e.g., a sum) of the number of users exposed to the media identified by the media identifier of the first column 1090 who are over the age of sixty. While in the illustrated example ages are divided into ranges of twenty years, any other range (e.g., one year, two years, five years, ten years, etc.) may be used.

In the illustrated example of FIG. 10C, the example table 1089 includes a sixth column representing a count (e.g., a sum) of the number of users exposed to the media identified by the media identifier of the first column 1090 who have an income under forty thousand dollars per year. The example table 1089 includes a seventh column representing a count (e.g., a sum) of the number of users exposed to the media identified by the media identifier of the first column 1090 who have an income between forty thousand and eighty thousand dollars per year. The example table 1089 includes an eighth column representing a count (e.g., a sum) of the number of users exposed to the media identified by the media identifier of the first column 1090 who have an income over eighty thousand dollars per year. While in the illustrated example incomes are divided into ranges of forty thousand dollars, any other ranges and/or divisions may additionally or alternatively be used. Furthermore, while in the illustrated example of FIG. 10C demographic information for age and income is aggregated, any other demographic information may additionally or alternatively be aggregated. Further, although age and income are shown separately, other combinations are possible (e.g., persons age 40-60 with income from 40$k$-60$k$ per year).

Figure 11:
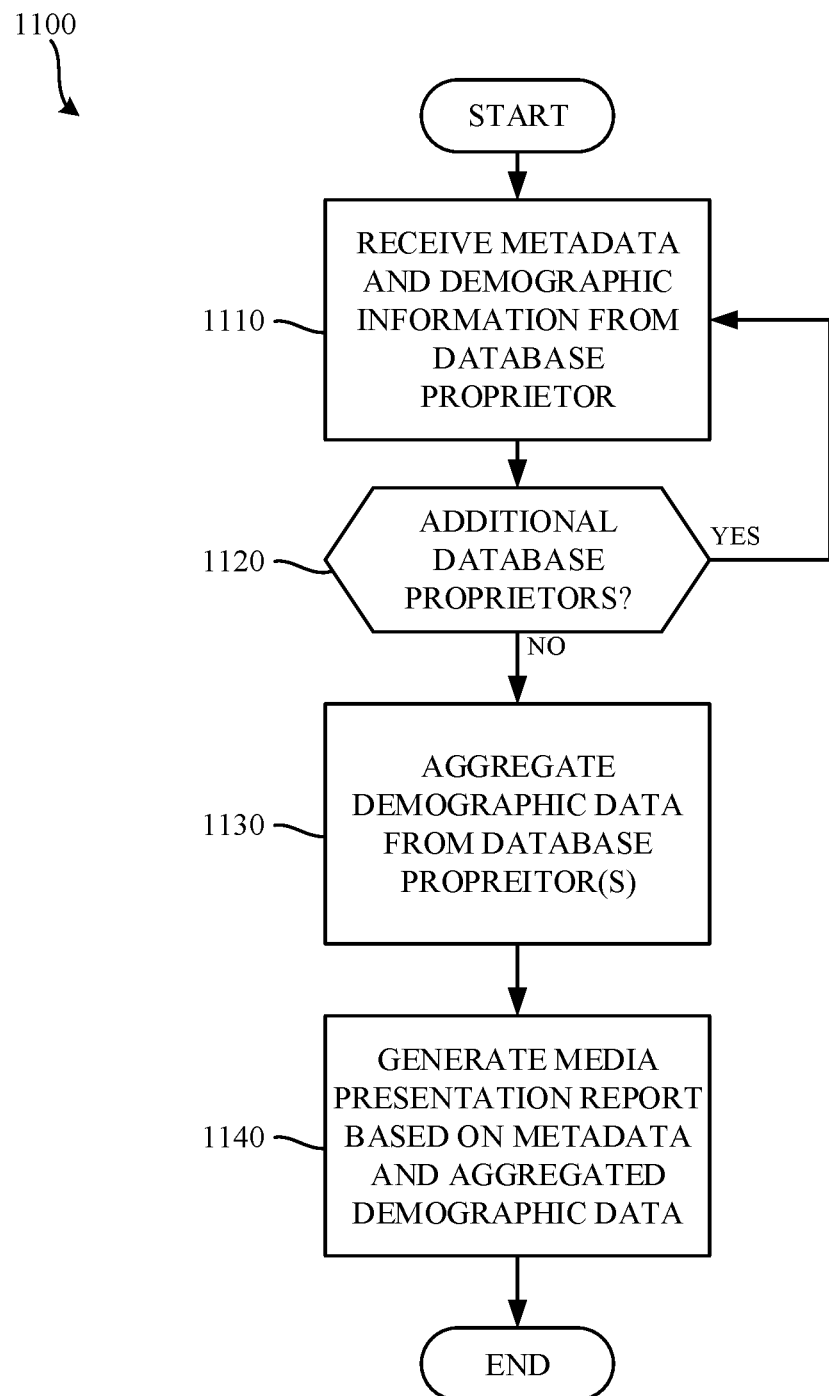
FIG. 11 is a flowchart representative of example machine-readable instructions which may be executed to implement the example central facility of FIGS. 1, 2, 2A, and/or 4A.

FIG. 11 is a flowchart representative of example machine-readable instructions 1100 which may be executed to implement the example central facility 170 of FIGS. 1 and/or 2. execution of the example machine-readable instructions 1100 of FIG. 11 begins when the central facility 170 receives metadata (which may be encrypted and/or formatted as an ID3 tag) and demographic information associated with the metadata from a database proprietor 180, 182 (block 1110). In the illustrated example, the data receiver 481 of the example central facility 170 receives metadata from the database proprietors 180, 182 without having first requested such data from the database proprietors. That is, the database proprietors 180, 182 send the associated demographic information to the central facility 170 on their own accord. The metadata processor 451 of the example central facility 170 then determines whether data from additional database proprietors should be received before proceeding (block 1120). For example, while the data receiver 481 of the example central facility 170 may have received data from a single database proprietor, receiving metadata and demographic information from multiple database proprietors may result in a more accurate report of the demographic exposure associated with the presented media. In some examples, the media-identifying metadata received in association with the demographic information may be encrypted. In such examples, the metadata processor 451 decrypts the encrypted media-identifying metadata to enable identification of the media.

If data has been received from a sufficient number of database proprietors (block 1120), the metadata processor 451 aggregates the demographic data from the database proprietor(s) (block 1130). The metadata processor 451 then generates a media presentation report based on the metadata and the aggregated demographic information (block 1140).

Figure 12:
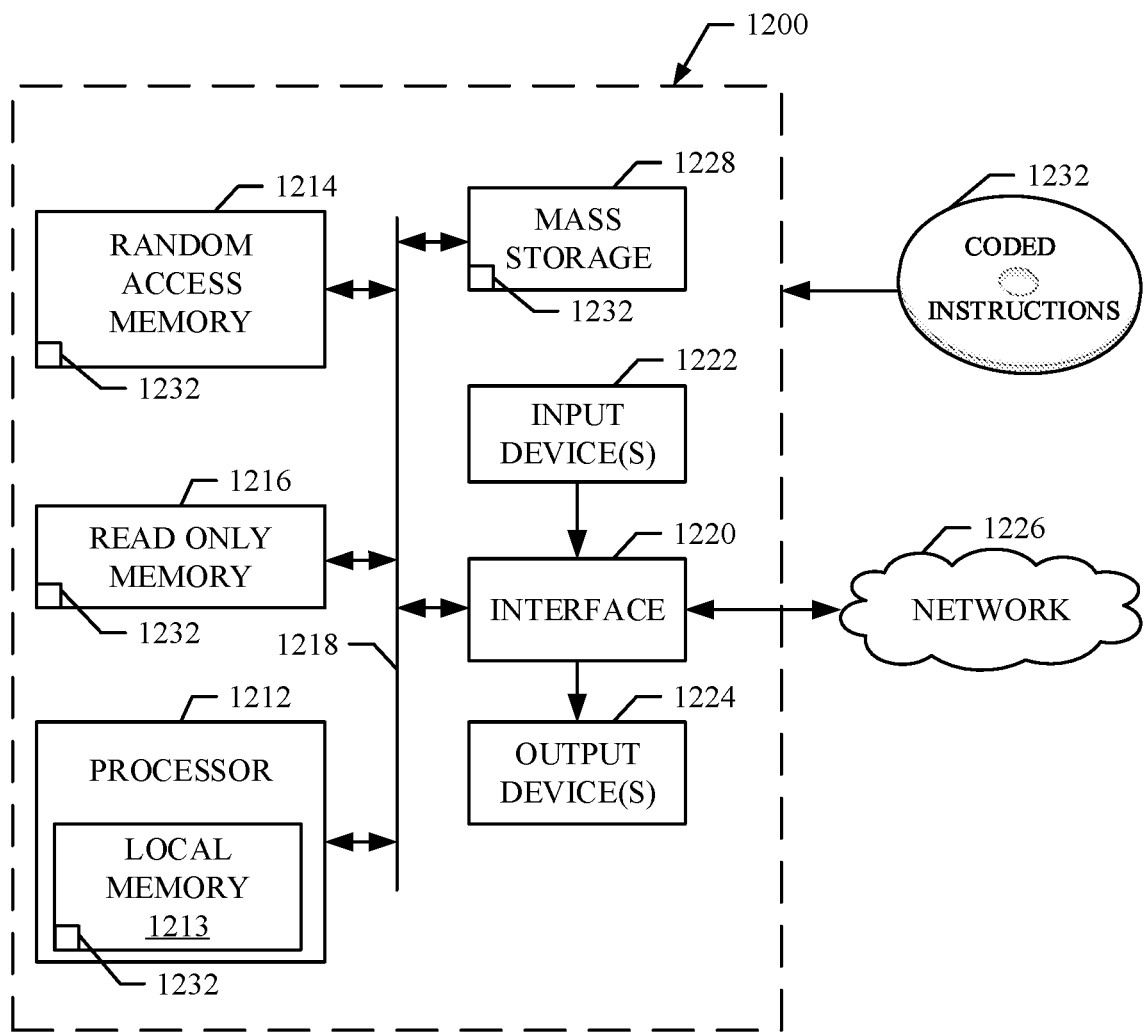
FIG. 12 is a block diagram of an example processor platform capable of executing the example machine-readable instructions of FIGS. 6, 7, 8, 9, 10, and/or 11 to implement the example service provider of FIGS. 1 and/or 2, the example browser of FIGS. 1, 2, 2A, and/or 3, the example database proprietor of FIGS. 1, 2, 2A, and/or 4, and/or the example central facility of FIGS. 1, 2, 2A, and/or 4A.

FIG. 12 is a block diagram of an example processor platform 1000 capable of executing the instructions of FIGS. 6, 7, 8, 9, 10, and/or 11 to implement the example service provider 120 of FIGS. 1 and/or 2, the example browser 165 of FIGS. 1, 2, and/or 3, and/or the example database proprietor 180, 182 of FIGS. 1, 2, and/or 4. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 6, 7, 8, 9, 10, and/or 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture enable monitoring of media presentations and association of demographic information provided by one or more database proprietors with the same. In particular, media identifying metadata (which may be encrypted and/or formatted as an ID3 tag) and user identifying information is transmitted to database proprietors by client devices in response to detecting a media presentation. The database proprietors aggregate demographic information (based on the user identifying information) in association with the presented media, and report the demographic information and the media-identifying information to an audience measurement entity.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to measure exposure to streaming media, the apparatus comprising:
   means for retrieving metadata associated with media presented at a client device, the metadata located in an ID3 tag, the means for retrieving to extract data from a first field of the metadata;
   means for determining a location to transmit the metadata, the location determined based on the data from the first field of the metadata; and
   means for communicating to transmit a request to the location, the request including a media identifier from a second field of the metadata and user-identifying data, the user-identifying data being accessible at the location, the second field of the metadata separate from the first field of the metadata, the media identifier identifying the streaming media.

2. The apparatus as described in claim 1, further including means for presenting the media at the client device.

3. The apparatus as described in claim 2, further including means for monitoring for an event triggered by the means for presenting, the means for retrieving to retrieve the metadata in response to detection of the event.

4. The apparatus as described in claim 3, wherein the event is a media presentation event.

5. The apparatus as described in claim 1, further including means for converting the metadata in the ID3 tag into a payload of the request.

6. The apparatus as described in claim 1, further including means for storing the user-identifying data.

7. The apparatus as described in claim 6, wherein the user-identifying data is cookie data.

8. An apparatus to measure exposure to streaming media, the apparatus comprising:
   means for retrieving metadata associated with streaming media presented at a client device, the metadata located in an ID3 tag, the means for retrieving to extract data from a first field of the metadata;
   means for determining a first internet domain to transmit the metadata, the first internet domain determined based on the data from the first field of the metadata; and
   means for communicating a first request to the first internet domain, the first request including a media identifier from a second field of the metadata and user-identifying data, the user-identifying data being accessible at the first internet domain, the second field of the metadata separate from the first field of the metadata, the media identifier identifying the streaming media, the means for communicating to receive a redirection message from the first internet domain, the means for communicating to send, in response to the redirection message, a second request to a second internet domain specified by the redirection message, the means for communicating to provide second user-identifying data to the second internet domain.

9. The apparatus as described in claim 8, further including means for presenting the streaming media at the client device.

10. The apparatus as described in claim 9, further including means for monitoring for an event triggered by the means for presenting, the means for retrieving to retrieve the metadata in response to detection of the event.

11. The apparatus as described in claim 10, wherein the event is a media presentation event.

12. The apparatus as described in claim 8, further including means for converting the metadata in the ID3 tag into a payload of the first request.

13. The apparatus as described in claim 8, further including means for storing the user-identifying data.

14. The apparatus as described in claim 13, wherein the user-identifying data is cookie data.

15. An apparatus to measure exposure to streaming media, the apparatus comprising:
   means for extracting metadata associated with streaming media presented at a client device, the means for extracting to extract data from a first field of the metadata;
   means for determining a first internet domain to transmit the metadata, the first internet domain determined based on the data from the first field of the metadata; and
   means for communicating a first request to the first internet domain, the first request including a media identifier from a second field of the metadata and user-identifying data, the user-identifying data being accessible at the first internet domain, the second field of the metadata separate from the first field of the metadata, the media identifier identifying the streaming media, the means for communicating to receive a redirection message from the first internet domain, the means for communicating to send, in response to the redirection message, a second request to a second internet domain specified by the redirection message, the means for communicating to provide second user-identifying data to the second internet domain.

16. The apparatus as described in claim 15, further including means for presenting the streaming media at the client device.

17. The apparatus as described in claim 16, further including means for monitoring for an event triggered by the means for presenting, the means for extracting to retrieve the metadata in response to detection of the event.

18. The apparatus as described in claim 17, wherein the event is a media presentation event.

19. The apparatus as described in claim 15, further including means for converting the metadata into a payload of the first request.

20. The apparatus as described in claim 15, further including means for storing the user-identifying data.

* * * * *